(12) United States Patent
Covic et al.

(10) Patent No.: US 11,756,727 B2
(45) Date of Patent: Sep. 12, 2023

(54) WIRELESS POWER TRANSFER COUPLING STRUCTURES WITH REDUCED LEAKAGE FLUX

(71) Applicant: AUCKLAND UNISERVICES LIMITED, Auckland (NZ)

(72) Inventors: Grant Anthony Covic, Auckland (NZ); Matthew Geoffrey Seymour Pearce, Whangarei (NZ)

(73) Assignee: AUCKLAND UNISERVICES LIMITED, Auckland (NZ)

( * ) Notice: Subject to any disclaimer, the term of this patent is extended or adjusted under 35 U.S.C. 154(b) by 0 days.

(21) Appl. No.: 17/280,623

(22) PCT Filed: Sep. 30, 2019

(86) PCT No.: PCT/IB2019/058274
§ 371 (c)(1),
(2) Date: Mar. 26, 2021

(87) PCT Pub. No.: WO2020/065631
PCT Pub. Date: Apr. 2, 2020

(65) Prior Publication Data
US 2022/0044868 A1    Feb. 10, 2022

(30) Foreign Application Priority Data

Sep. 28, 2018 (NZ) ...................... 746841

(51) Int. Cl.
*H01F 38/14* (2006.01)
*H01F 27/36* (2006.01)
(Continued)

(52) U.S. Cl.
CPC .............. *H01F 38/14* (2013.01); *B60L 53/12* (2019.02); *H01F 27/36* (2013.01); *H01F 27/363* (2020.08);
(Continued)

(58) Field of Classification Search
CPC ........ H01F 38/14; H01F 27/36; H01F 27/363; H01F 27/38; H01F 41/04; H01F 41/046;
(Continued)

(56) References Cited

U.S. PATENT DOCUMENTS 10,377,255 B2 *  8/2019  Budhia ................. H02J 7/0042
2014/0266004 A1 *  9/2014  Andrews, Jr. ........... B60L 53/36
                                                        320/108
(Continued)

OTHER PUBLICATIONS

Chun Qiu et al., "A Comparative Study of Flux Cancelation among Multiple Interconnected Modular Pads in Lumped IPT System," Progress In Electromagnetics Research M, Jan. 2016, pp. 131-140, vol. 49.
(Continued)

*Primary Examiner* — Jared Fureman
*Assistant Examiner* — Michael J Warmflash
(74) *Attorney, Agent, or Firm* — Pilloff Passino & Cosenza LLP; Martin J. Cosenza

(57) ABSTRACT

A wireless coupling structure has a first layer comprising a flux coupling coil having two opposing end regions separated by two opposing side regions; a second layer comprising a first block of ferrite and a second block of ferrite; and a third layer comprising a leakage flux control coil. The first block is provided next to one of the end regions and the second block is provided next to the other of the end regions.

33 Claims, 37 Drawing Sheets

(51) Int. Cl.
  *H02J 50/12* (2016.01)
  *H02J 50/40* (2016.01)
  *H02J 50/70* (2016.01)
  *B60L 53/12* (2019.01)
  *H01F 27/38* (2006.01)

(52) U.S. Cl.
  CPC .............. *H01F 27/38* (2013.01); *H02J 50/12* (2016.02); *H02J 50/40* (2016.02); *H02J 50/70* (2016.02)

(58) Field of Classification Search
  CPC . B60L 53/12; H02J 50/12; H02J 50/40; H02J 50/70; H02J 50/402; H02J 50/90; H02J 5/00; Y02T 10/70; Y02T 10/7072; Y02T 90/12; Y02T 90/14
  See application file for complete search history.

(56) References Cited

U.S. PATENT DOCUMENTS

| | | | | |
|---|---|---|---|---|
| 2015/0170833 A1* | 6/2015 | Widmer | .................. | H01F 38/14 |
| | | | | 307/104 |
| 2017/0222490 A1* | 8/2017 | Boys | ....................... | H02J 50/12 |
| 2017/0366046 A1* | 12/2017 | Werner | .................. | H02J 50/70 |
| 2019/0173317 A1* | 6/2019 | Zaheer | .................. | H02J 50/70 |

OTHER PUBLICATIONS

International Search Report & Written Opinion for PCT/IB2019/058274, dated Jan. 17, 2020.

\* cited by examiner

TABLE I

KEY SIMULATED VALUES FOR THE PADS DISCUSSED IN THIS PAPER, CENTRED AND DISPLACED AT AN AIR GAP OF 175 mm. SIMULATED $I_1$, $VA_1$ AND LEAKAGE IS WITH THE SYSTEM DELIVERING 1 kVA TO THE SECONDARY. LEAKAGE IN X AND Y IS THE MAXIMUM ON A PLANE 800 MM FROM THE CENTRE OF THE SECONDARY, AND LEAKAGE IN Z IS THE MAXIMUM ON A PLANE 200 MM BELOW THE TOP COPPER SURFACE OF THE DRIVEN WINDING.

| | Pad | Corresponding Figures | $L_p$ μH | $L_s$ μH | $k_{ps}$ | $I_1$ $A_{RMS}$ | $VA_1$ kVA | $B_{RMS}(X)$ @$I_1$ (μT) | $B_{RMS}(Y)$ @$I_1$ (μT) | $B_{RMS}(Z)$ @$I_1$ (μT) |
|---|---|---|---|---|---|---|---|---|---|---|
| AG 175 Centred (0, 0) | FFDD | 4(a), 14(a), 18(a) | 65.2 | 4.11 | 0.1391 | 38.5 | 51.7 | 14.2 | 6.0 | 19.1 |
| | RFDD | 4(b), 14(c), 18(b) | 45.6 | 4.07 | 0.1185 | 54.1 | 71.3 | 10.7 | 3.8 | 245.7 |
| | RFDDwR | 4(e), 14(e), 18(c) | 39.6 | 4.08 | 0.1145 | 60.0 | 76.2 | 9.8 | 4.0 | 94.5 |
| | RFDDwRwE | 11, 14(g), 18(d) | 43.2 | 4.08 | 0.1124 | 58.6 | 79.1 | 7.2 | 3.2 | 73.0 |
| AG 175 Displaced (75, 100) | FFDD | 14(b) | 64.7 | 4.11 | 0.0978 | 55 | 105 | 29.0 | 13.2 | 27.8 |
| | RFDD | 14(d) | 45.4 | 4.06 | 0.0800 | 80 | 156 | 24.2 | 9.5 | 366.4 |
| | RFDDwR | 14(f) | 39.4 | 4.07 | 0.0758 | 91 | 174 | 22.0 | 9.8 | 146.1 |
| | RFDDwRwE | 14(h) | 43.0 | 4.07 | 0.0743 | 89 | 181 | 16.9 | 8.3 | 111.4 |

FIG. 7

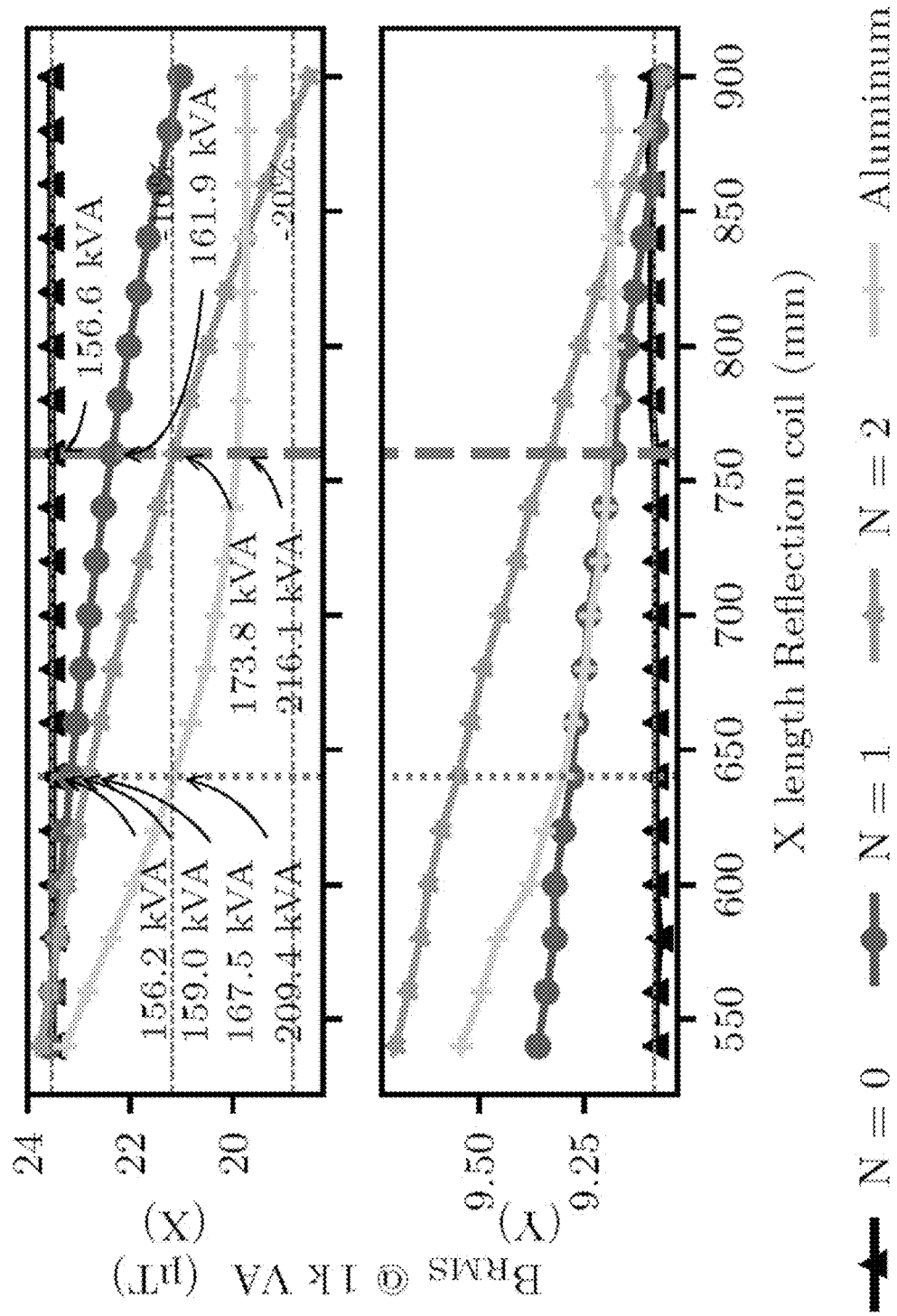
FIG. 11a1

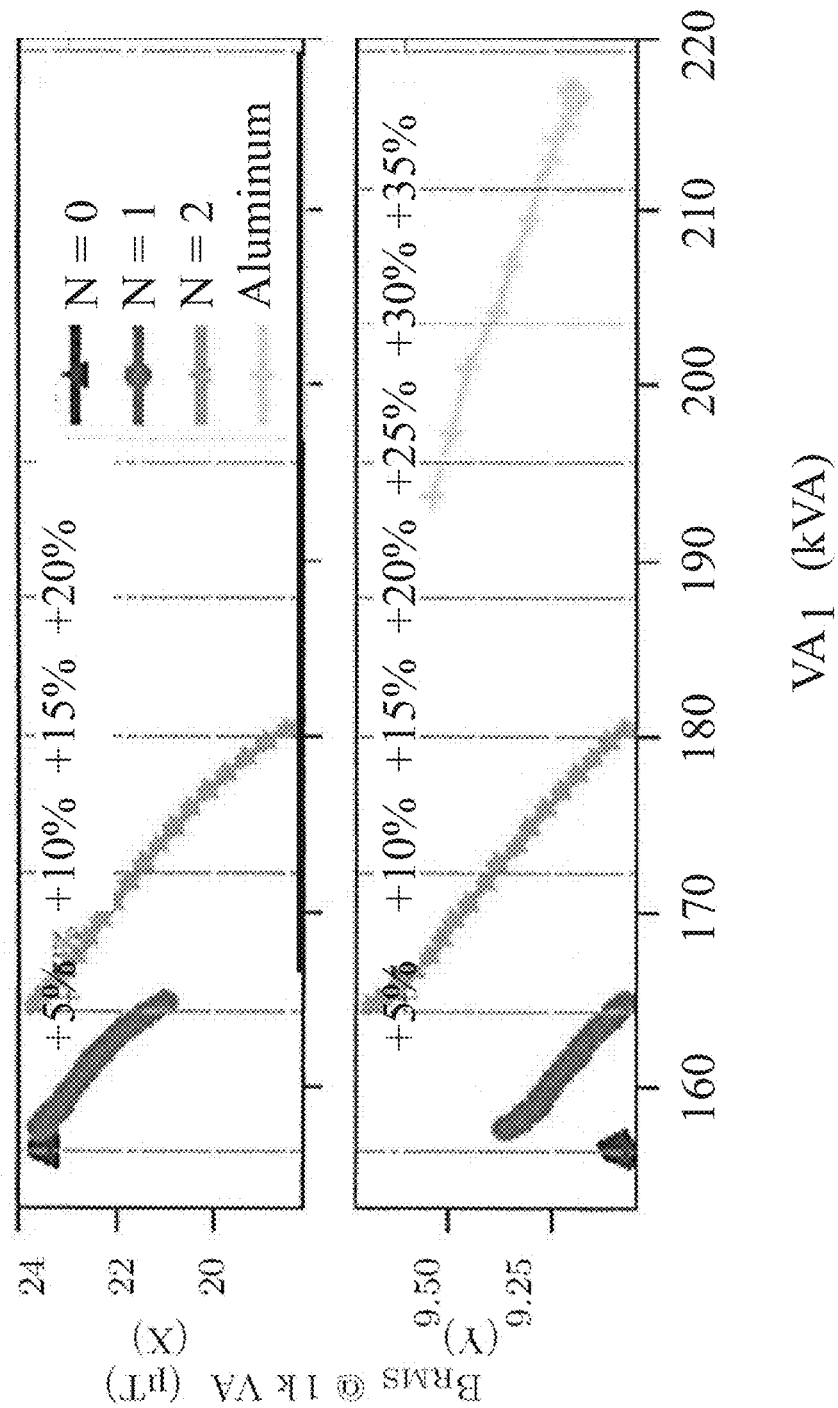
FIG. 11a2

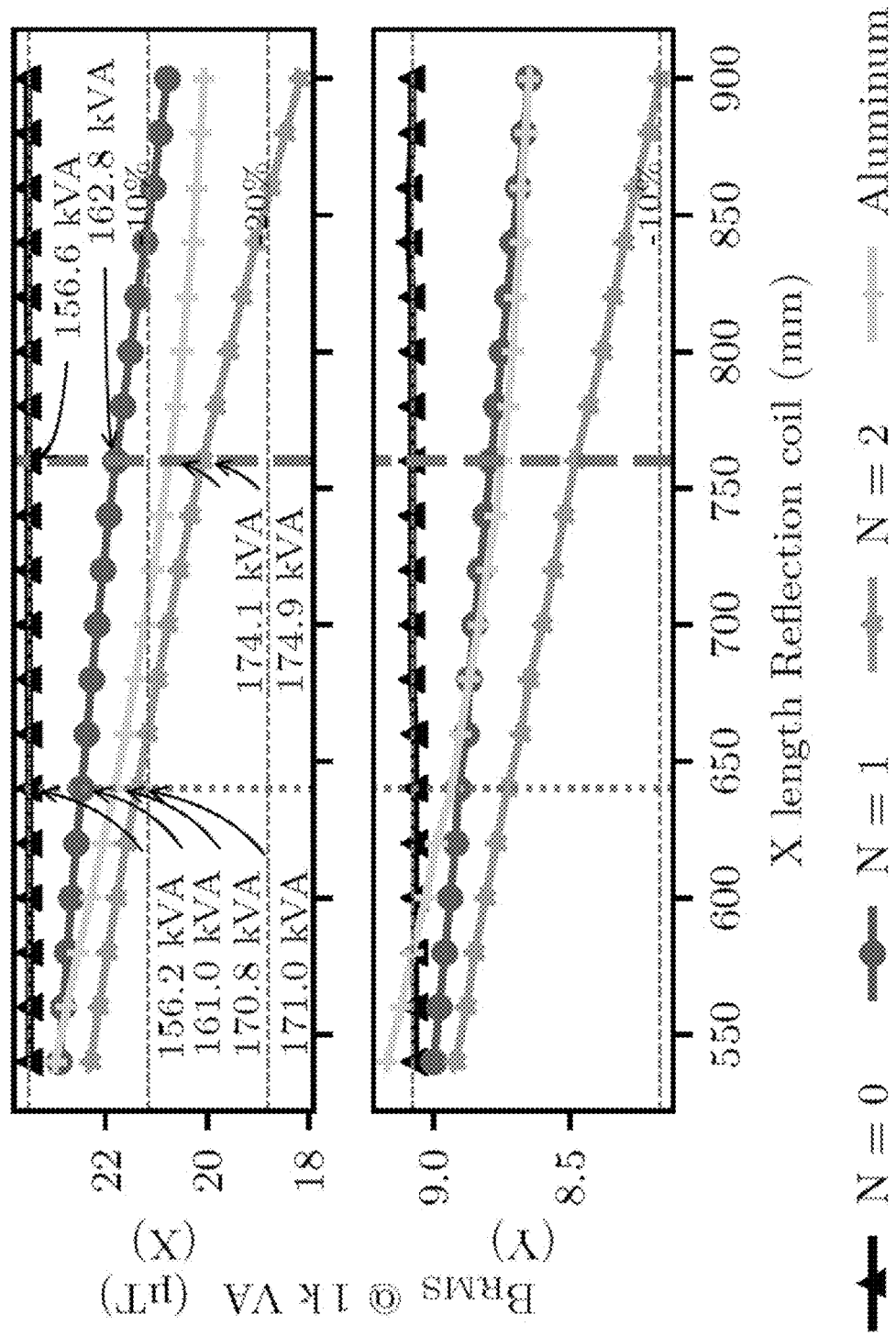
FIG. 11b1

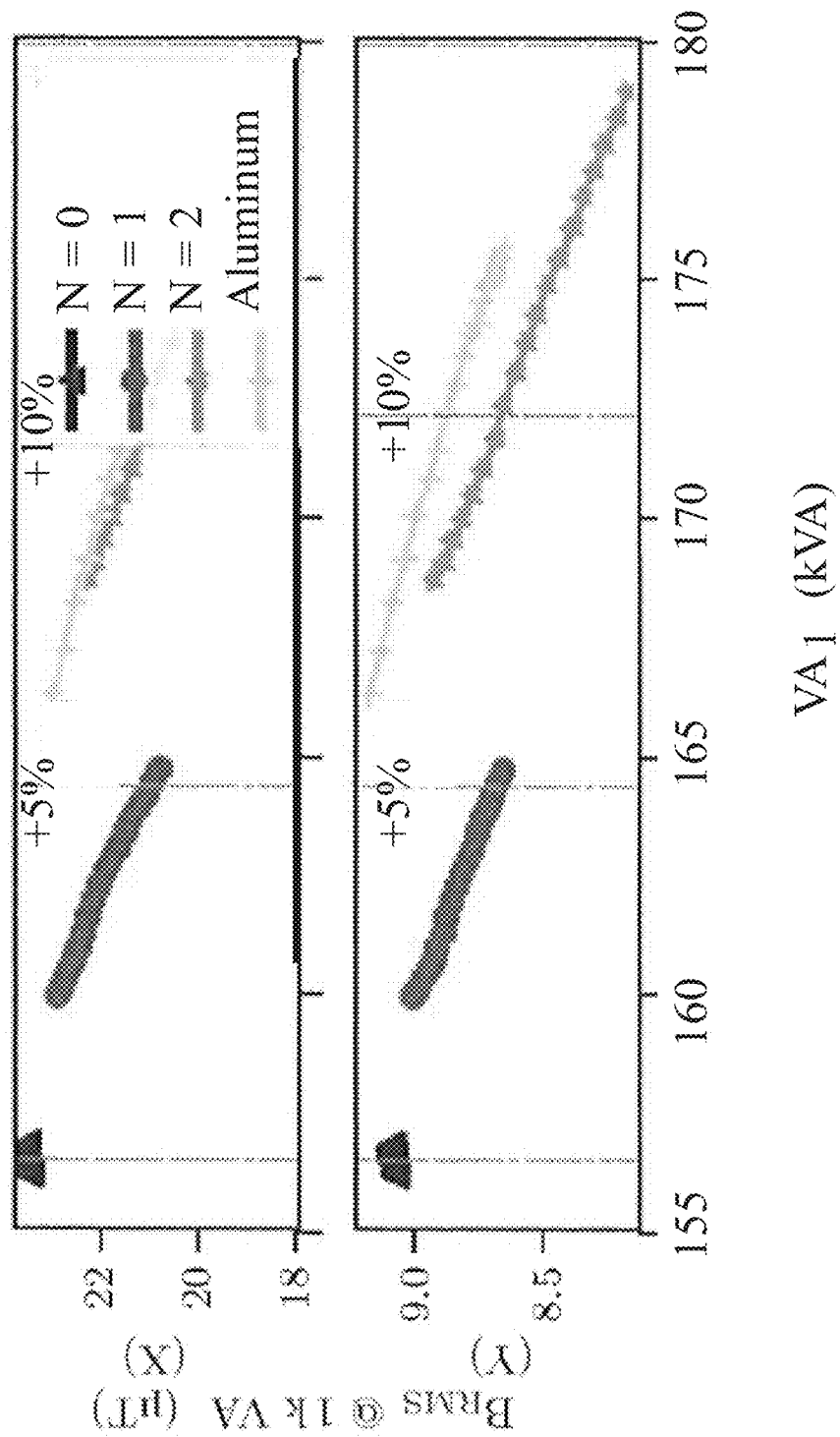
FIG. 11b2

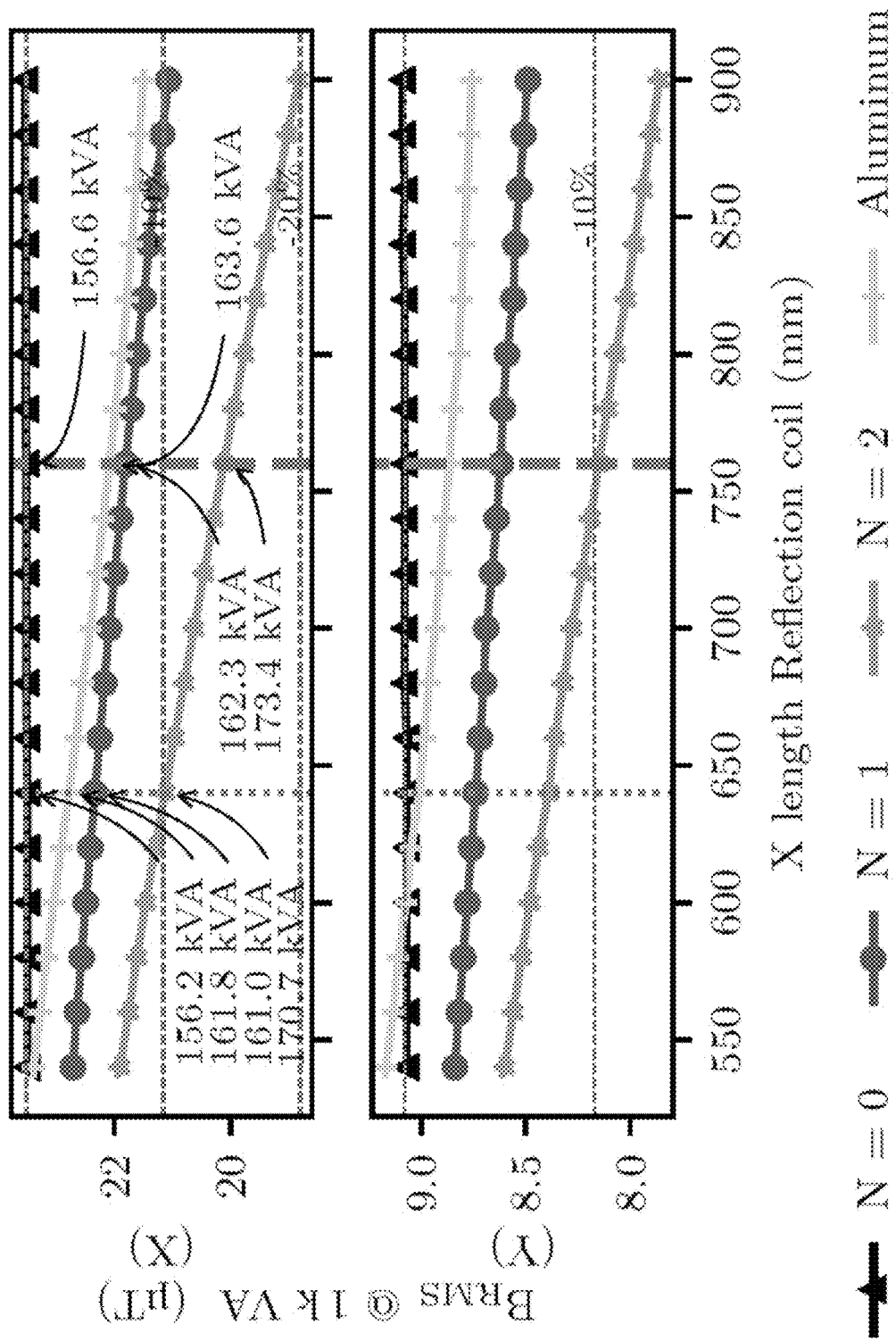
FIG. 11c1

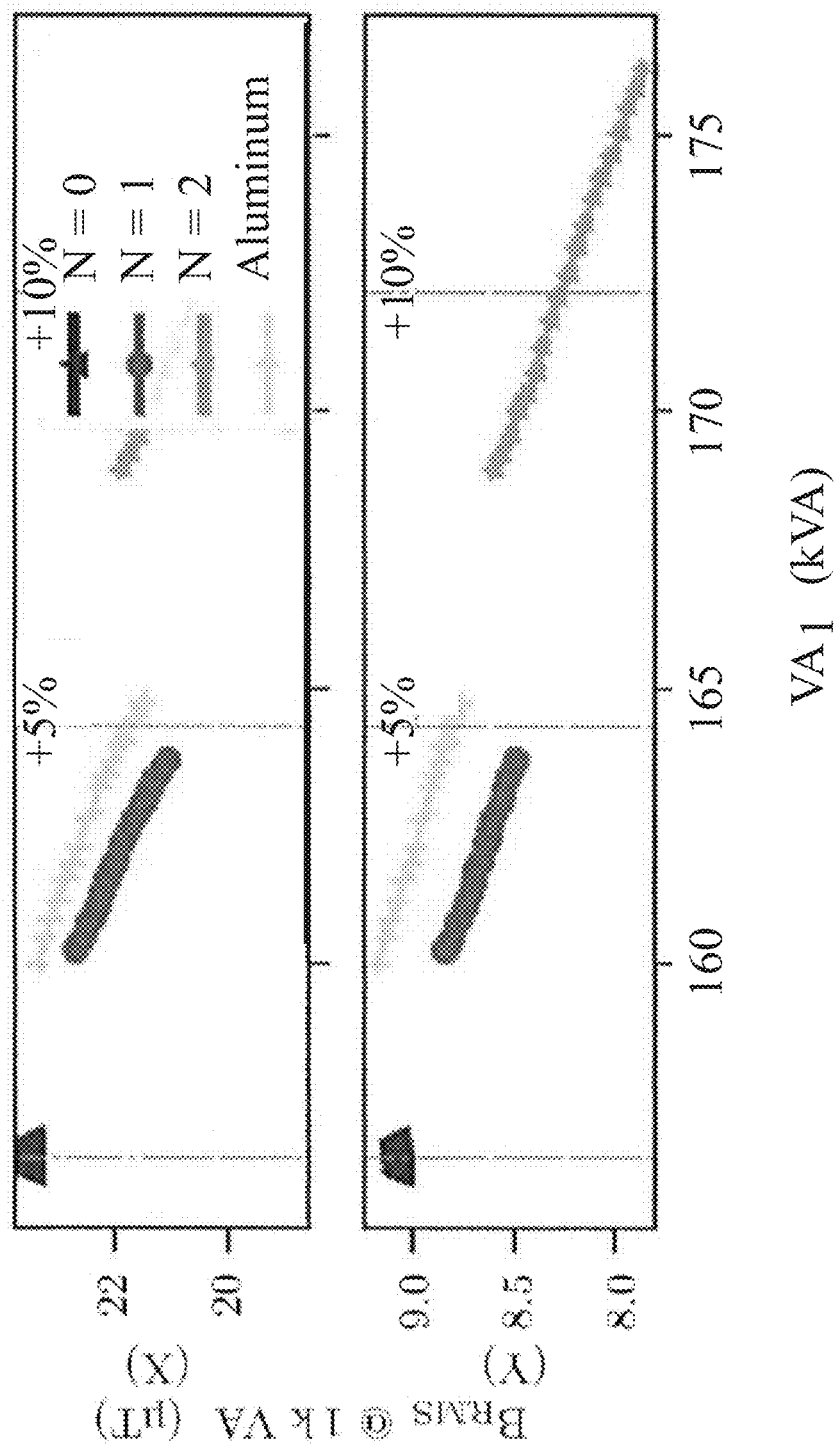
FIG. 11c2

WIRELESS POWER TRANSFER COUPLING STRUCTURES WITH REDUCED LEAKAGE FLUX

FIELD OF INVENTION

The disclosed subject matter relates to wireless power transfer, and in particular to magnetic coupling structures for facilitating wireless (or inductive) power transfer. Some applications of the disclosed subject matter include charging devices (including vehicles) wirelessly.

BACKGROUND

Wireless power transfer (WPT), which is also referred to as Inductive Power Transfer (IPT), is a safe and convenient technology that allows contactless high power transfer for many diverse applications. It has been applied in biomedical, materials handling, and cellphone charging and is now a practical solution for stationary Electric Vehicle (EV) wireless charging.

Research into powering and charging EVs wirelessly while they are in motion is currently being undertaken. These systems are known as roadway systems, and distinguish themselves from static charging and materials handling systems because they are located in public, outdoor and harsh environments.

Determining the best wireless or magnetic coupler structure and geometry for systems is an important topic. These structures are commonly referred to as pads, since they are usually provided with a low profile, suitable for use on a desktop (for example to charge a cell phone), or on a garage floor or roadway (for example to charge an EV). The term pads, when used in this document, refers to wireless power coupling structures.

Most existing commercial pads use large quantities of a highly magnetically permeable material. This magnetic material is typically ferrite, so the term ferrite is used in this document to refer to suitably magnetically permeable materials for use with wireless coupling structures, but other materials having similar properties may also be used. Ferrite has the advantage of significantly improving magnetic performance and power transfer, but has the disadvantage of being brittle and, if not suitable protected, may easily crack and degrade due to the high forces experienced in use, particularly in a roadway environment. Thus a roadway system with reduced ferrite is desirable. Aluminum is used in existing pads for shielding, but this is also undesirable in some applications, such as a road surface, as it may corrode when exposed to the materials that make up the roadbed, such as concrete.

OBJECTS OF INVENTION

It is an object of the invention to provide a wireless power transfer coupling apparatus which will at least go some way toward overcoming disadvantages of existing apparatus or systems, or which will at least provide a useful alternative to existing systems.

Further objects of the invention will become apparent from the following description.

SUMMARY OF INVENTION

In one aspect a wireless coupling apparatus is provided comprising:

a first layer comprising a flux coupling coil having two opposing end regions separated by two opposing side regions;

a second layer comprising a first block of highly magnetically permeable material and a second block of highly magnetically permeable material;

a third layer comprising a leakage flux control coil;

wherein the first block is provided proximate to one of the end regions and the second block is provided proximate to the other of the end regions.

In another aspect a wireless coupling apparatus is provided comprising:

a first layer comprising two flux coupling coils, each flux coupling coil having two opposing end regions separated by two opposing side regions, the flux coupling coils being located adjacent to each other with an end region of one coil being adjacent to the end region of the other coil;

a second layer comprising one or more blocks of highly magnetically permeable material;

a third layer comprising two leakage flux control coils;

wherein the block are provided proximate to those end regions of the flux coupling coils which are adjacent to each other.

Preferably the second layer comprises a plurality of blocks of highly permeable material, each block being provided proximate to an end region.

Preferably the or each block does not extend to the side regions of the flux coupling coil.

Preferably the flux coupling coils are positioned end to end in the first layer.

Preferably the flux coupling coils are substantially coplanar.

Preferably the or each flux coupling coil includes a central aperture.

Preferably the blocks do not extend across the aperture.

Preferably the or each leakage flux control coil is located relative to a corresponding flux coupling coil to control leakage flux from the flux coupling coil.

Preferably the leakage flux control coils are located end to end in the third layer.

Preferably the leakage flux control coils are substantially coplanar.

In another aspect a wireless coupling apparatus is provided comprising:

a first layer comprising a flux coupling coil;

a second layer comprising a highly magnetically permeable material;

a third layer comprising a leakage flux control coil;

wherein at least part of the periphery of the leakage flux control coil extends beyond a part of the periphery of the magnetically permeable material.

In another aspect a wireless coupling track or path is provided comprising a plurality of adjacent wireless coupling apparatus as claimed in any one of the preceding claims.

In another aspect a roadway is provided including a track or path as set forth in any one of the preceding statements.

In another aspect a wireless coupling apparatus is provided comprising:

a first layer comprising a flux coupling coil having two opposing end regions separated by two opposing side regions;

a second layer comprising a plurality of blocks of highly magnetically permeable material;

a third layer comprising a leakage flux control coil;

wherein the blocks are provided proximal to the end regions of the flux coupling coil and do not extend to the side regions of the flux coupling coil.

In another aspect a wireless coupling apparatus is provided comprising:
a first layer comprising two flux coupling coils, each flux coupling coil having two opposing end regions separated by two opposing side regions, the flux coupling coils being located adjacent to each other with an end region of one coil being adjacent to the end region of the other coil;
a second layer comprising a plurality of blocks of highly magnetically permeable material;
a third layer comprising two leakage flux control coils;
wherein the blocks are provided proximal to the end regions of the flux coupling coil and do not extend to the side regions of the flux coupling coil.

Preferably the flux coupling coils are positioned end to end in the first layer Preferably the flux coupling coils are substantially coplanar.

Preferably the or each flux coupling coil includes a central aperture.

Preferably the blocks do not extend across the aperture.

Preferably the or each leakage flux control coil is located relative to a corresponding flux coupling coil to control leakage flux from the flux coupling coil.

Preferably the leakage flux control coils are located end to end in the third layer.

Preferably the leakage flux control coils are substantially coplanar.

In another aspect a wireless coupling apparatus is provided comprising:
a first layer comprising a flux coupling coil;
a second layer comprising a highly magnetically permeable material;
a third layer comprising a leakage flux control coil;
wherein at least part of the periphery of the leakage flux control coil extends beyond a part of the periphery of the flux coupling coil.

In yet another aspect a wireless coupling track or path is provided comprising a plurality of adjacent wireless coupling apparatus as set forth in any one of the preceding statements.

In another aspect a roadway is provided which includes a track or path as set forth in the preceding statement.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification which include that term, the features, prefaced by that term in each statement, all need to be present, but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference.

The disclosed subject matter also provides method or system which may broadly be said to consist in the parts, elements and features referred to or indicated in this specification, individually or collectively, in any or all combinations of two or more of those parts, elements or features. Where specific integers are mentioned in this specification which have known equivalents in the art to which the invention relates, such known equivalents are deemed to be incorporated in the specification.

Other aspects of the invention may become apparent from the following description which is given by way of example only and with reference to the accompanying drawings.

DRAWING DESCRIPTION

A number of embodiments of the invention will now be described by way of example with reference to the drawings as follows.

FIG. 7 is a table of simulated values for pads discussed herein

FIGS. 11a1-11c2 are a series of plots for varying size of reflection coils, where FIG. 11a is at a 40 mm depth, FIG. 11b is at a 100 mm depth, and FIG. 11c is at a 160 mm depth, where the reflection coil is out of phase, and where these figure show changing the size of the reflection coil in the X direction only, with ferrite dimensions of 250×100, at the just noted different depths.

Figure 12:
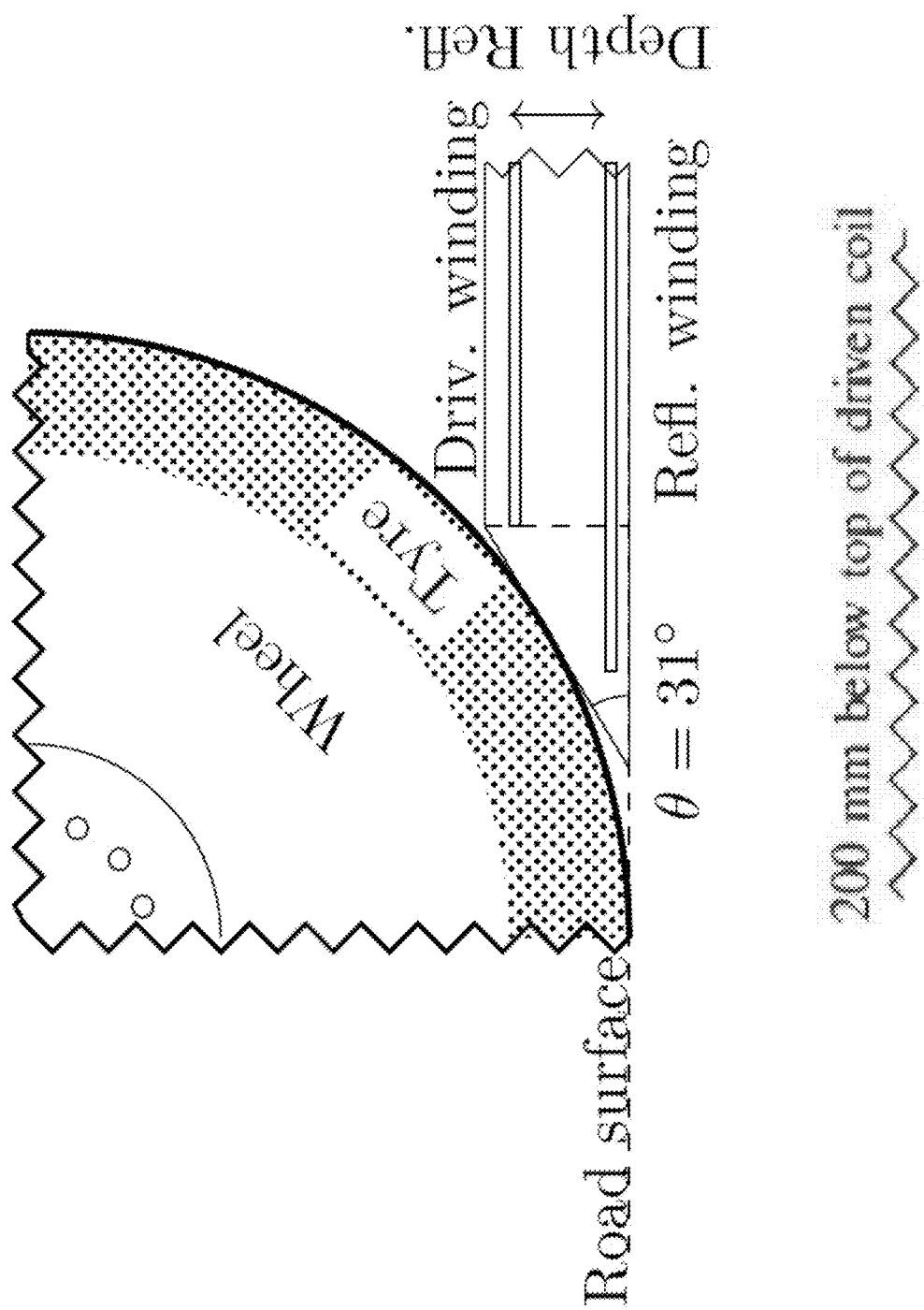

FIG. 12 is a partial side elevation of a wireless power transfer primary structure having a main coil and a reflection coil located on a roadway next to an approaching vehicle tyre.

Figure 13:
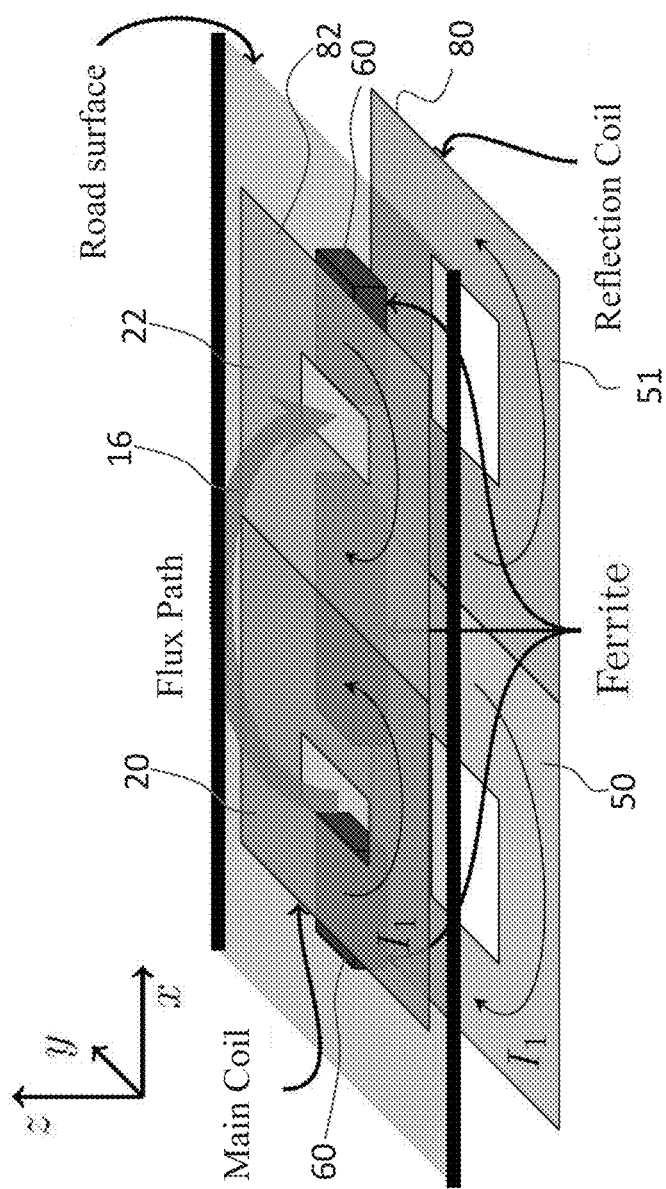

FIG. 13 is a diagrammatic isometric view of a reduced ferrite DD pad, with a reflection or leakage flux control coil and ferrite at the edges of the pad.

Figure 14A:
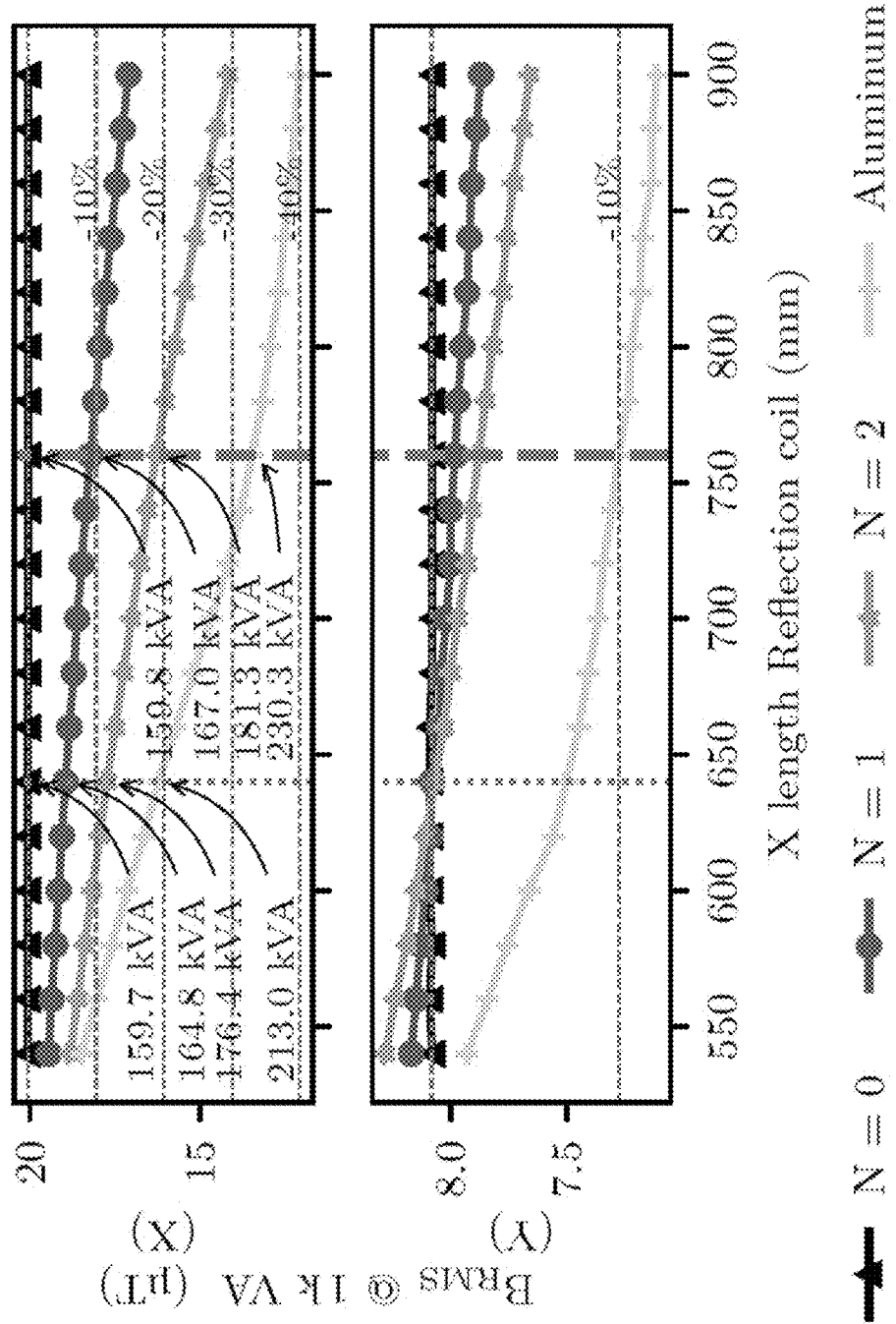
Figure 14B:
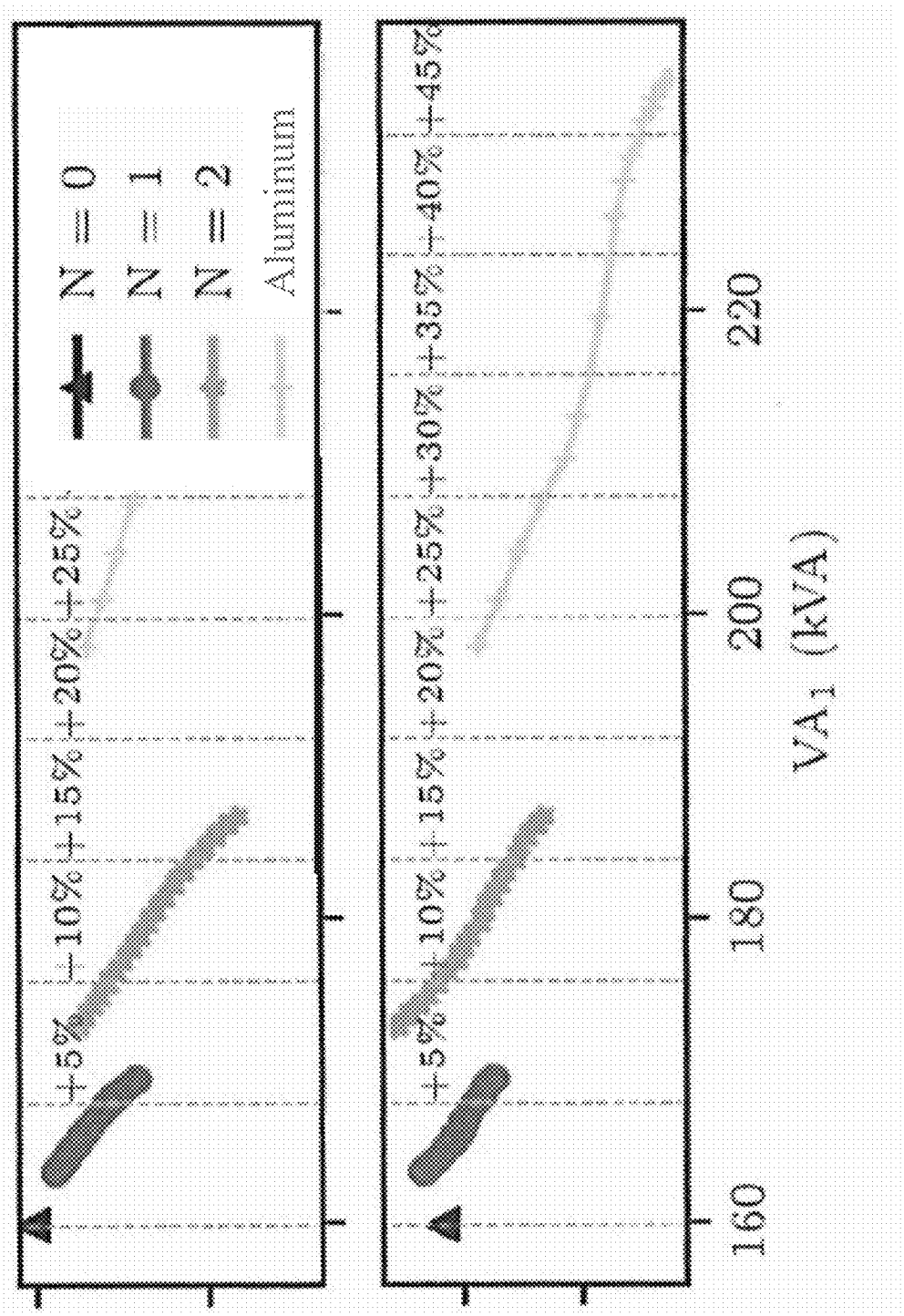

FIGS. 14a-14b are a series of plots illustrating the effect of ferrite at the end regions of the driving or main flux coupling coils.

Figure 15:
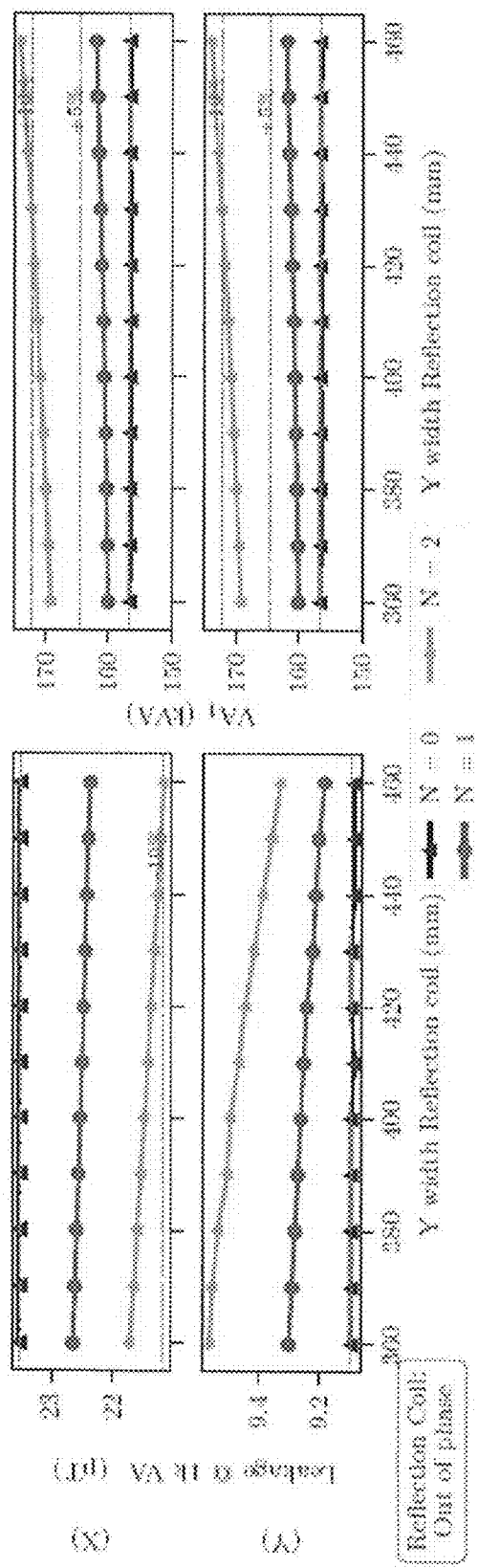
Figure 16A:
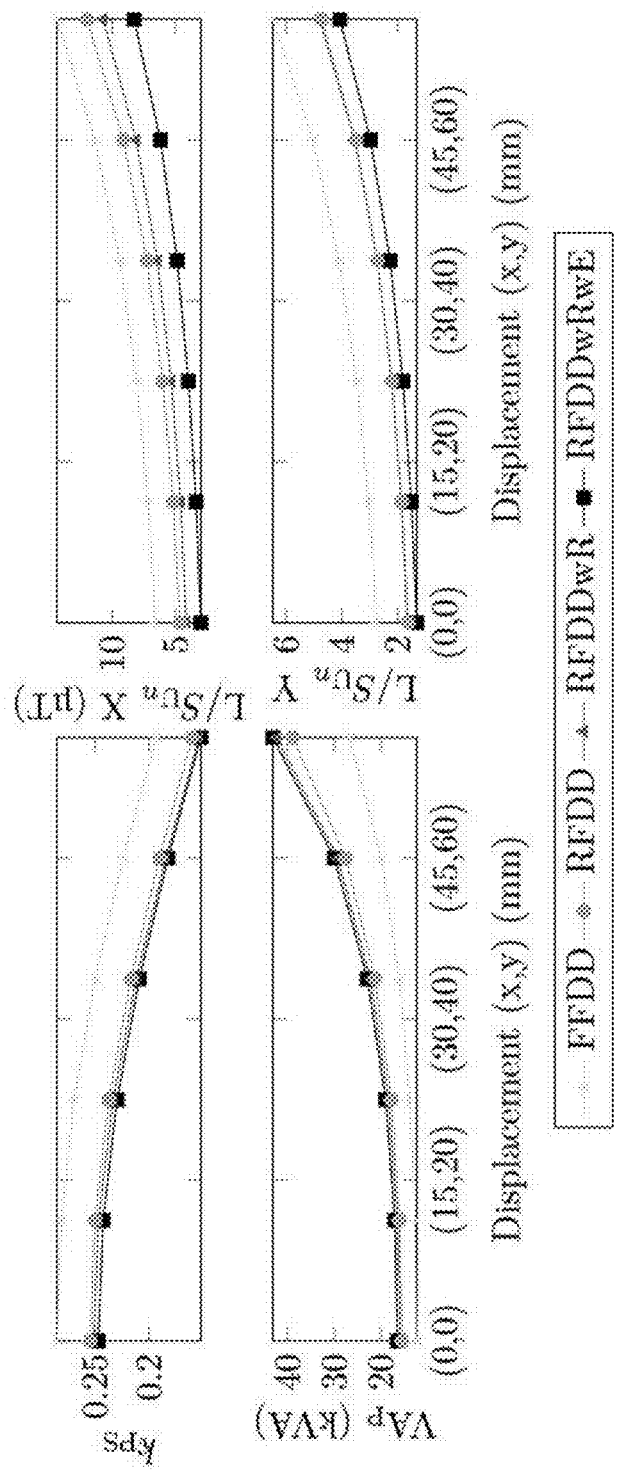
Figure 16B:
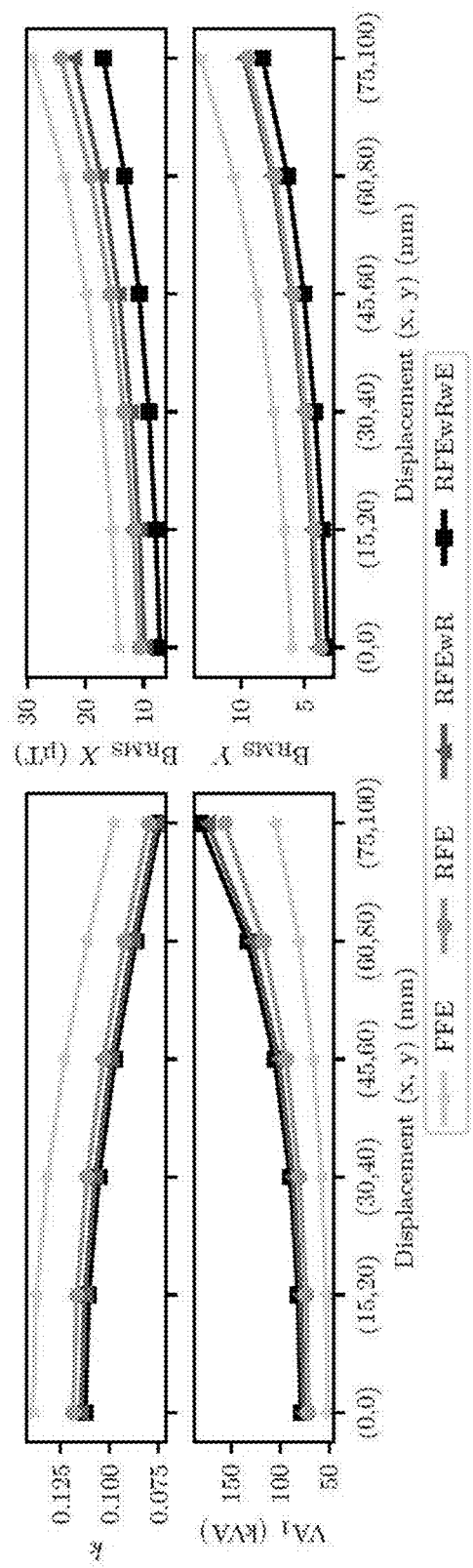
Figure 17A:
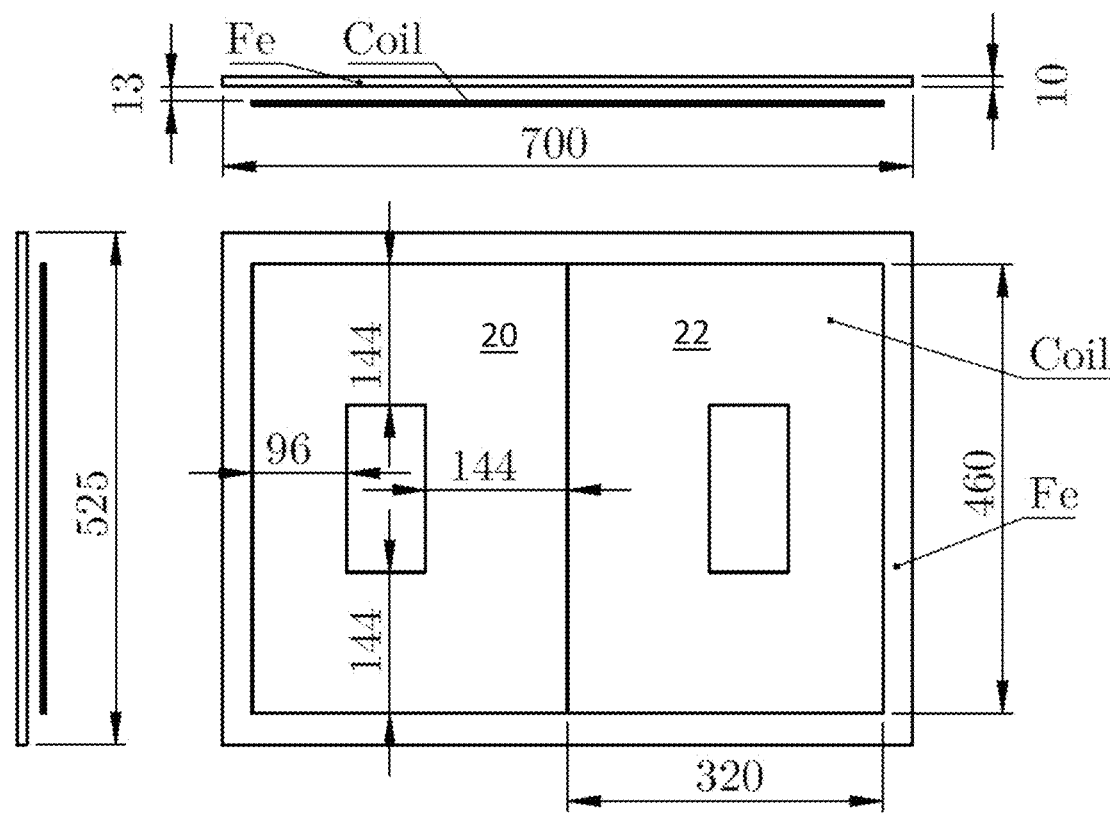
Figure 17B:
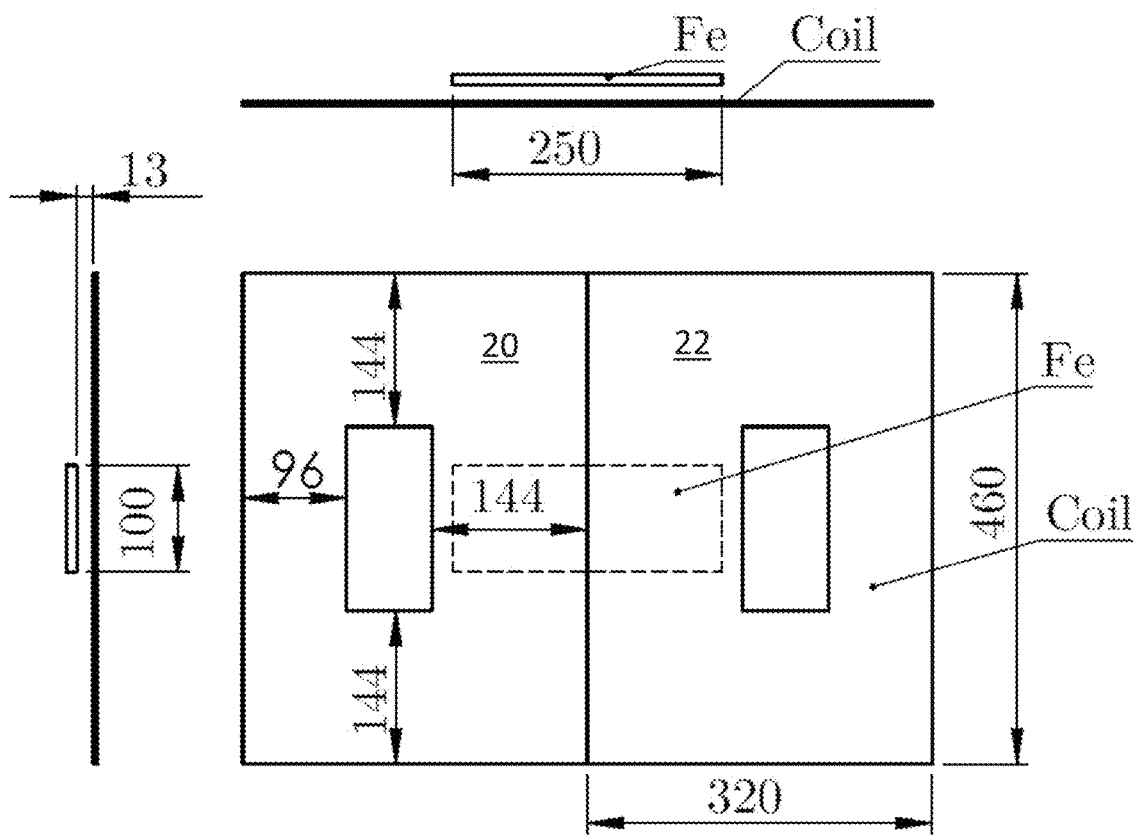
Figure 17C:
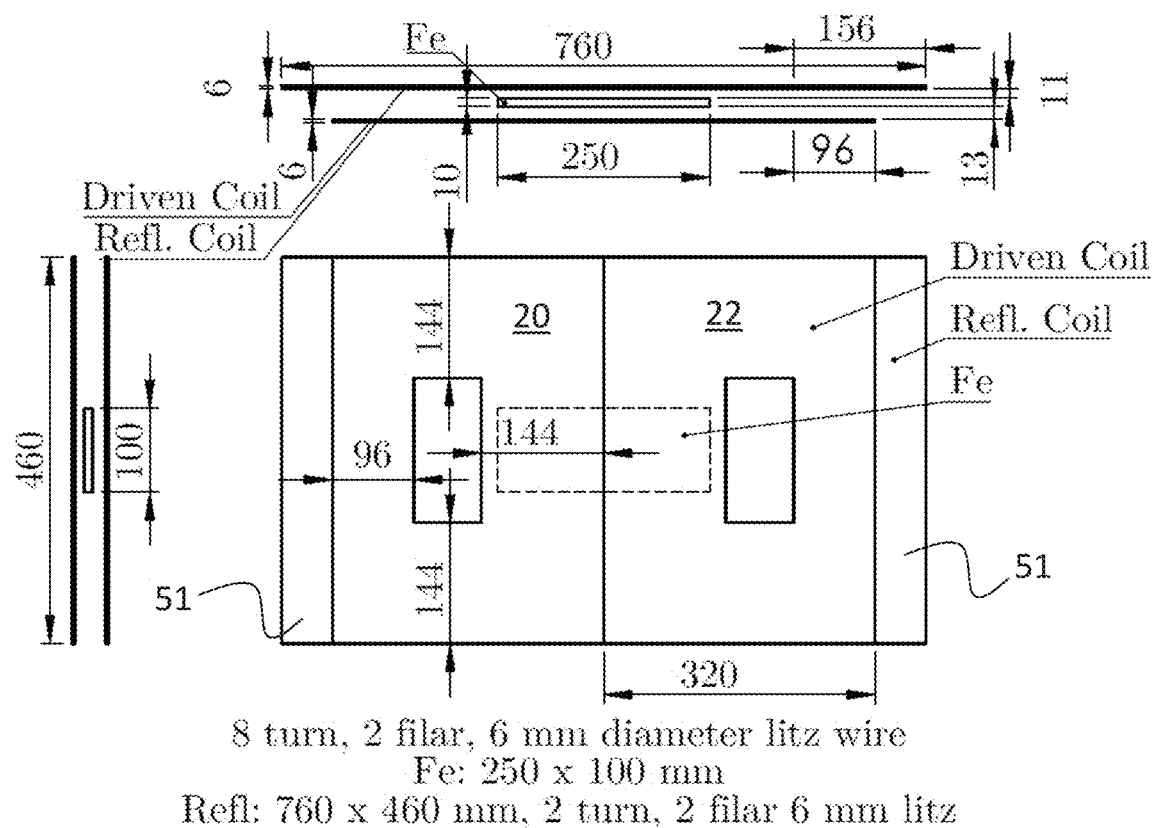
Figure 17D:
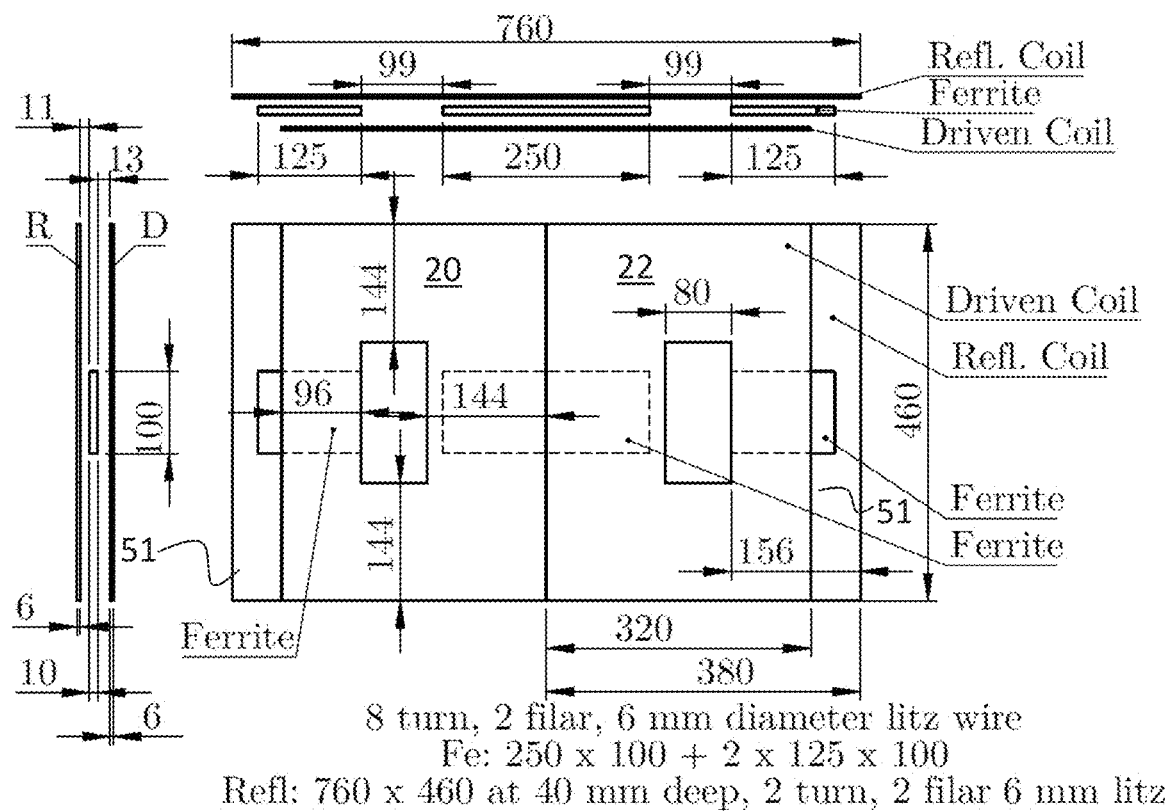

FIG. 15 is a series of plots for varying the size of the reflection coil in the Y dimension FIGS. 16a and 16b show the overall simulated results, where FIG. 16a is a secondary air gap of 100 mm and FIG. 16b is for a secondary airgap of 175 mm, and FIG. 17 summarizes the dimensions of structures disclosed in this document.

FIG. 17 shows dimensions of pad constructions disclosed herein.

Figure 18:
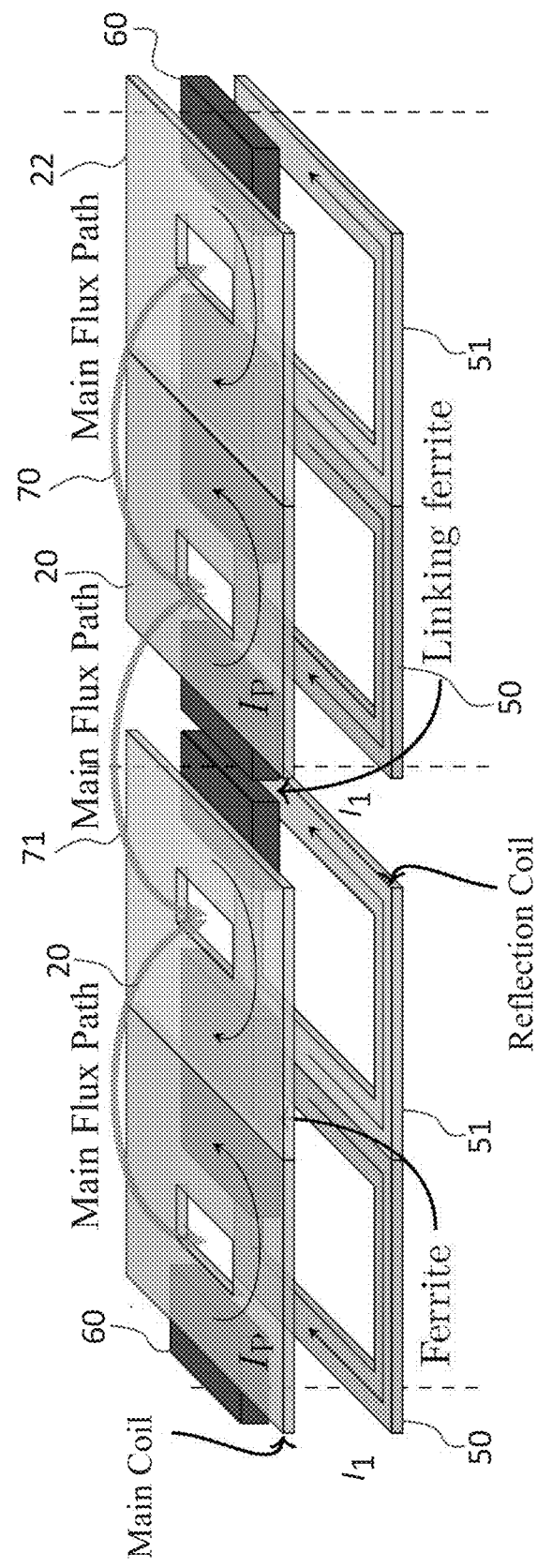
Figure 19:
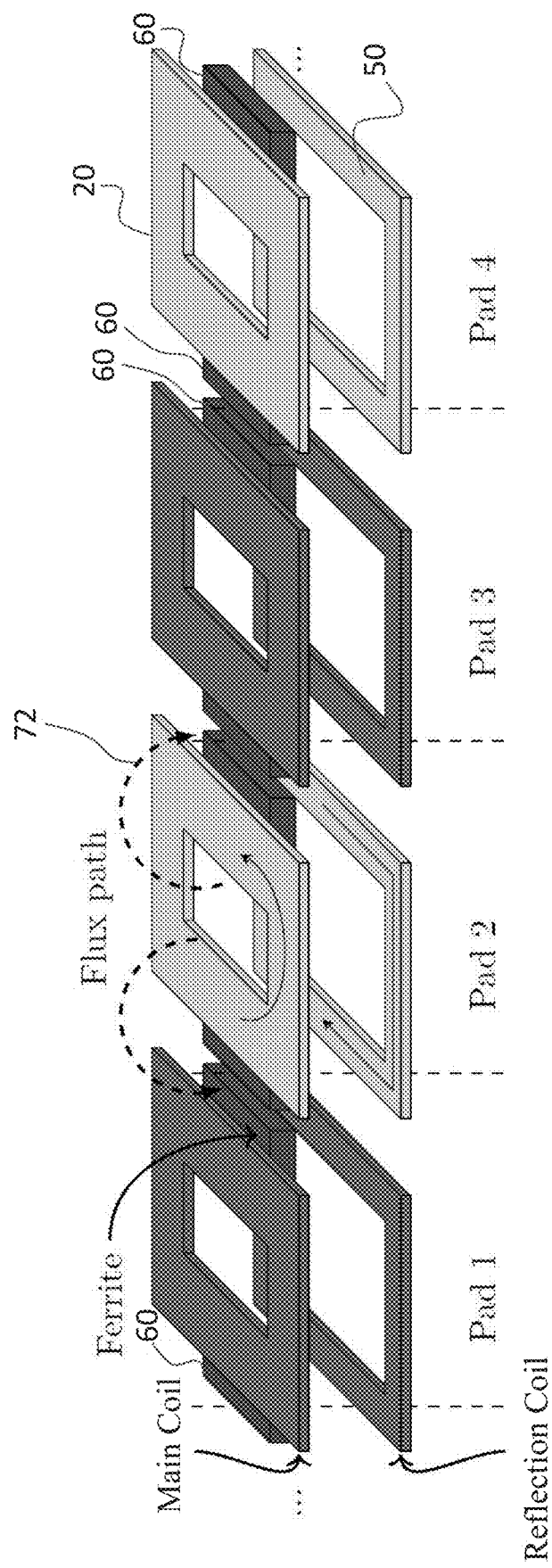
Figure 20:
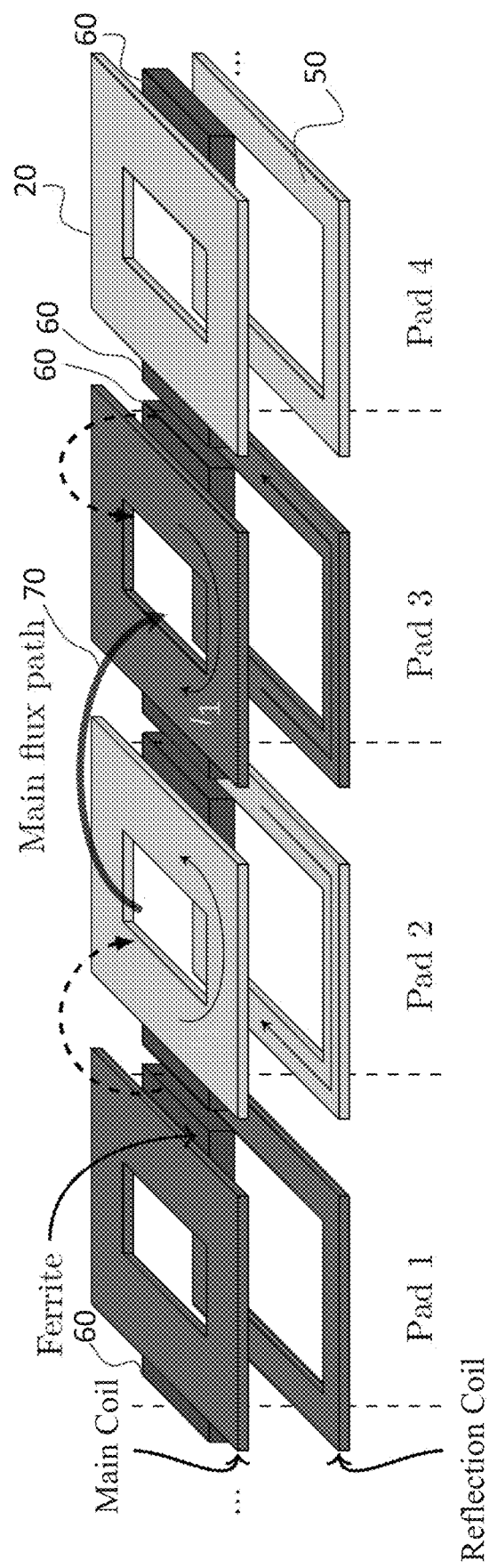

FIG. 18-20 show diagrammatic isometric views of track arrangements comprising pad structures according to the invention.

DESCRIPTION OF ONE OR MORE PREFERRED EMBODIMENTS OR EXAMPLES

This disclosure investigates the limits of strategic placement of small quantities of ferrite in a primary pad, and the improvements that can be gained from an additional coil (also referred to in this document as a reflection coil) which controls leakage flux and which is added below the primary flux coupling coil to help contain and shape the magnetic field produced or received by the pad.

A background to roadway IPT systems is provided in patent publication WO2011/016736. Background on a pad construction referred to in that document and in this disclosure as a DD pad (or Double D pad) is provided in WO2010/090539. Use of a reflection or leakage flux control coil that may be used to shape the field produced for coupling flux is disclosed in WO 2016/039644. The disclosure of all these documents is incorporated herein by reference. For ease of understanding the present disclosure, some general background in wireless power transfer systems is provided below.

Figure 1:
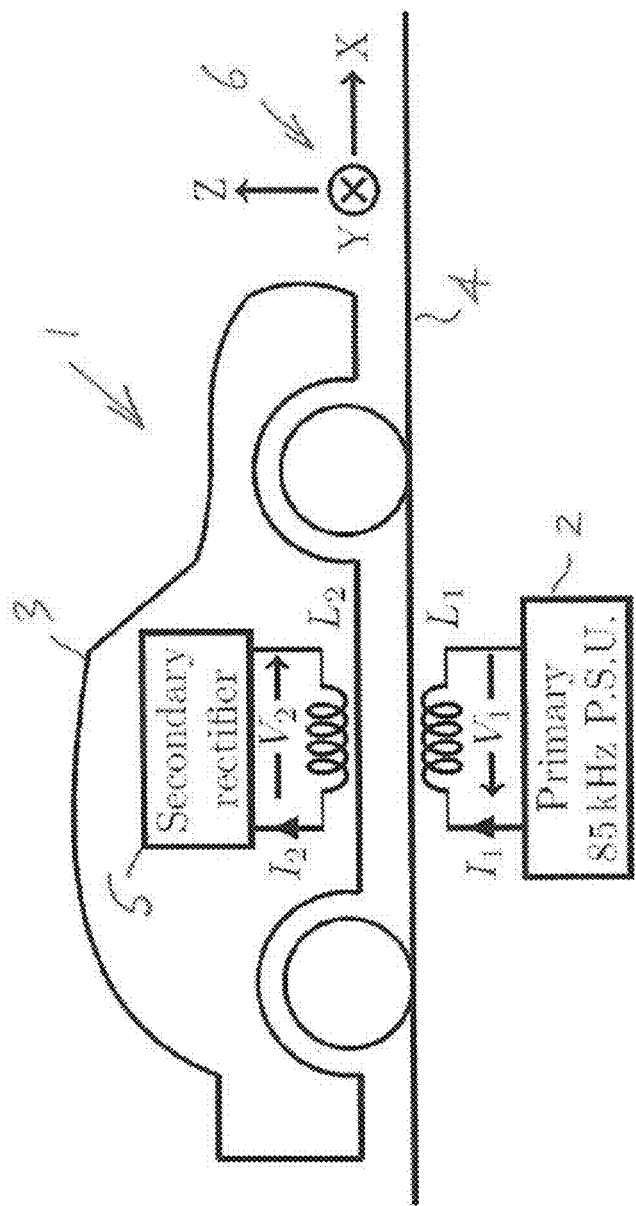
FIG. 1 is a diagram showing an example of a high level overview of a wireless power transfer (IPT) system in an EV context, showing an in-ground primary coupler, and a secondary coupler associated with a vehicle.
Figure 2:
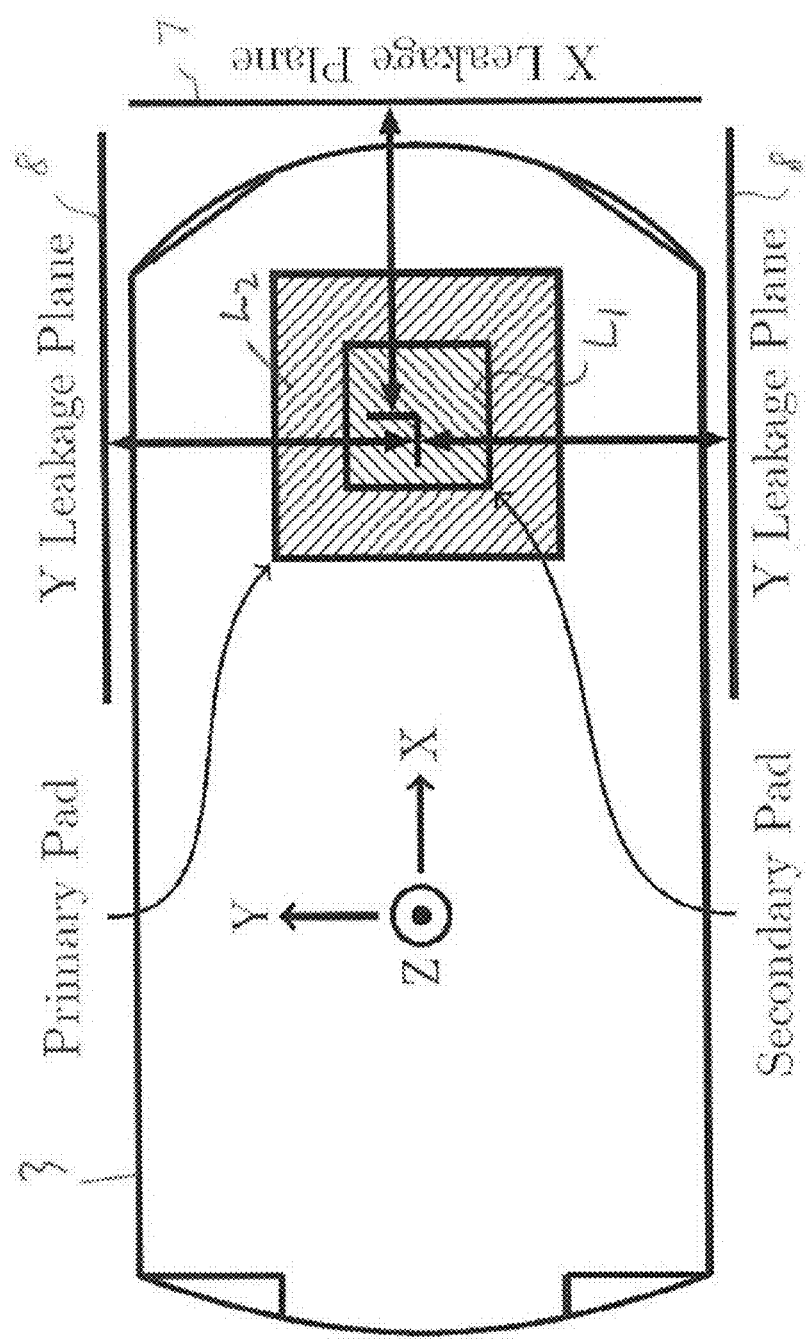
FIG. 2 is a diagrammatic plan view of the arrangement of FIG. 1, showing a secondary pad in a vehicle overlaid on a primary pad located in a roadway.

FIGS. 1 and 2 depict a high level overview of an IPT system generally referenced 1. Such systems transfer power with the aid of a magnetic field between two loosely coupled wireless power coupling structures. The primary coupler is represented by inductor or coil $L_1$ and the secondary coupler by inductor or coil $L_2$. In practice the coils are tuned using tuning capacitors which may be connected in series or parallel with coils $L_1$ and $L_2$. The primary coupler is located in a roadway 4 and is energized by a power supply 2 to produce a magnetic field which is intercepted by the secondary coupler which is located in EV 3. The output of the secondary coupler is provided to a power conditioning circuit shown in FIG. 1 as rectifier 5. The co-ordinate system (x,y,z) which is used in this disclosure is shown in FIG. 1 and generally referenced 6. Choosing a suitable coupling (k) range for a given range of air gaps is needed to allow resonance and power transfer across the entire operating region.

In any system, the power transferred is proportional to the secondary loaded quality factor of the tuned circuit ($Q_2$), $$P_{OUT} = S_U Q_2,$$

where $P_{OUT}$ is the output power and $S_U$ is the secondary uncompensated output apparent power. Increasing $Q_2$ increases the output power, however there is a practical upper limit on $Q_2$ of around 10 in the secondary tuning network due to high circulating currents (when parallel tuned) or high voltages (when series tuned) and due to an increased system sensitivity to the narrow tuning band.

To determine $S_U$, the uncompensated secondary apparent power, the open circuit voltage ($V_{OC}=j\omega M_{12}I_1$) of the secondary pad can be multiplied by the short circuit current ($I_{SC}=V_{OC}/j\omega L_2$)

$$S_U = |V_{OC}||I_{SC}| = \omega \frac{M_{12}^2}{L_2} I_1^2 = \omega(k^2 L_1) I_1^2,$$

where $I_1$ is the current in the primary.

This can also be expressed more succinctly in terms of the primary and secondary VAs:

$$S_U = k^2 VA_1$$

where $VA_1$ is the VA of the unloaded primary pad inductor.

Since the focus of this disclosure is the comparison of pad magnetic topologies, the secondary loaded quality factor can be temporarily ignored to focus on only the magnetic design. Thus in this document $S_U$ is used as the measure of output power capability, and higher is better. The pad referred to below in this document is designed to provide an $S_U$ of 1 kVA at nominal air gap under misalignment and when correctly loaded will allow a power transfer between 7-10 kW, by increasing the circuit $Q_2$.

The leakage magnetic field is also a critical metric for the acceptance of practical pad designs. In this disclosure, this is taken as the maximum RMS magnetic flux density ($B_{RMS}$) measured anywhere on a plane from the centre of the secondary pad in either the X or Y direction, and should be kept below the International Commission on Non-Ionizing Radiation Protection (ICNIRP) guidelines wherever people may be present. A distance from the center of the secondary pad is used which represents where a person might be standing at the side of a car, illustrated in FIG. 2. Leakage is taken as the maximum value at the sides of the vehicle, from the center of the secondary pad. X leakage plane 7 and Y leakage planes 8 are shown in FIG. 2.

Ultimately the objective when designing an IPT or WPT coupling system is to produce a system with a high power transfer and high efficiency with a low leakage magnetic field, but also with significantly improved robustness, which also functions over a large air gap between the primary and secondary pads. This disclosure presents means to achieve some of these objectives.

The following abbreviations are used in this document:

AFDD
Base case Full Ferrite Double D, with aluminium back-plane
FFDD
Full Ferrite Double D, no aluminium back-plane, set up as in lab
RFDD
Reduced Ferrite DD
RFDDwR
Reduced Ferrite DD with Reflection coil
RFDDwRwE
Reduced Ferrite DD with Reflection coil and with Extra ferrite In this application, given the variable nature of the thickness of the pad (as the depth of the reflection coil into the road changes) the leakage in the Z direction is recorded as the maximum on a plane at a depth of 200 mm below the top surface of the driven coil copper.

Comparison with Full Ferrite: FFDD

Figure 3A:
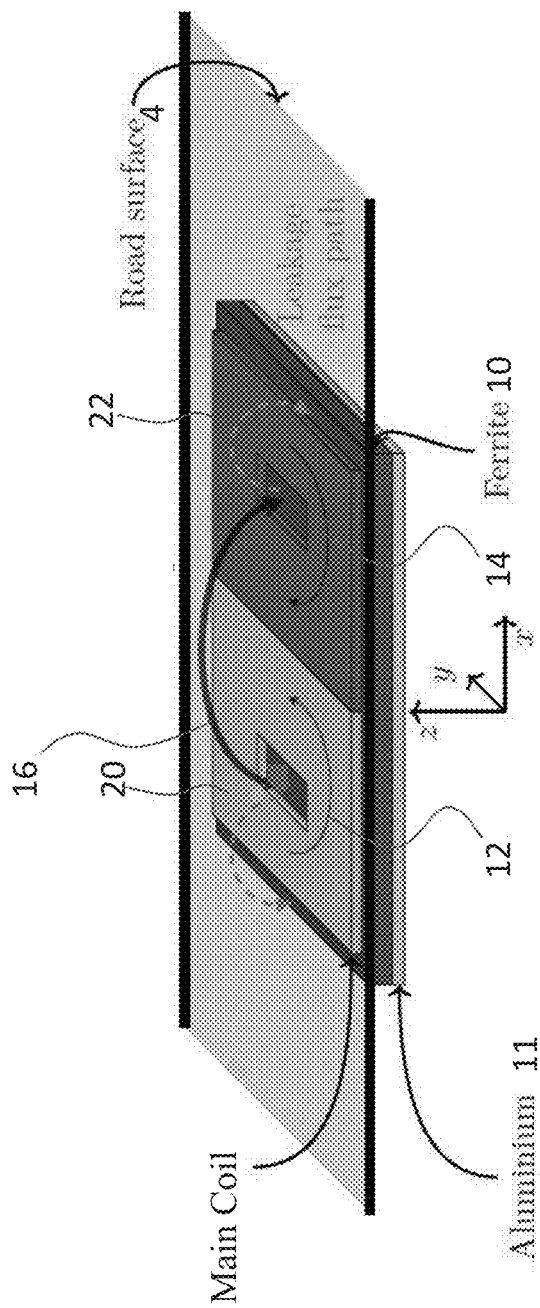
FIG. 3a is an isometric view showing a DD pad construction.
Figure 3B:
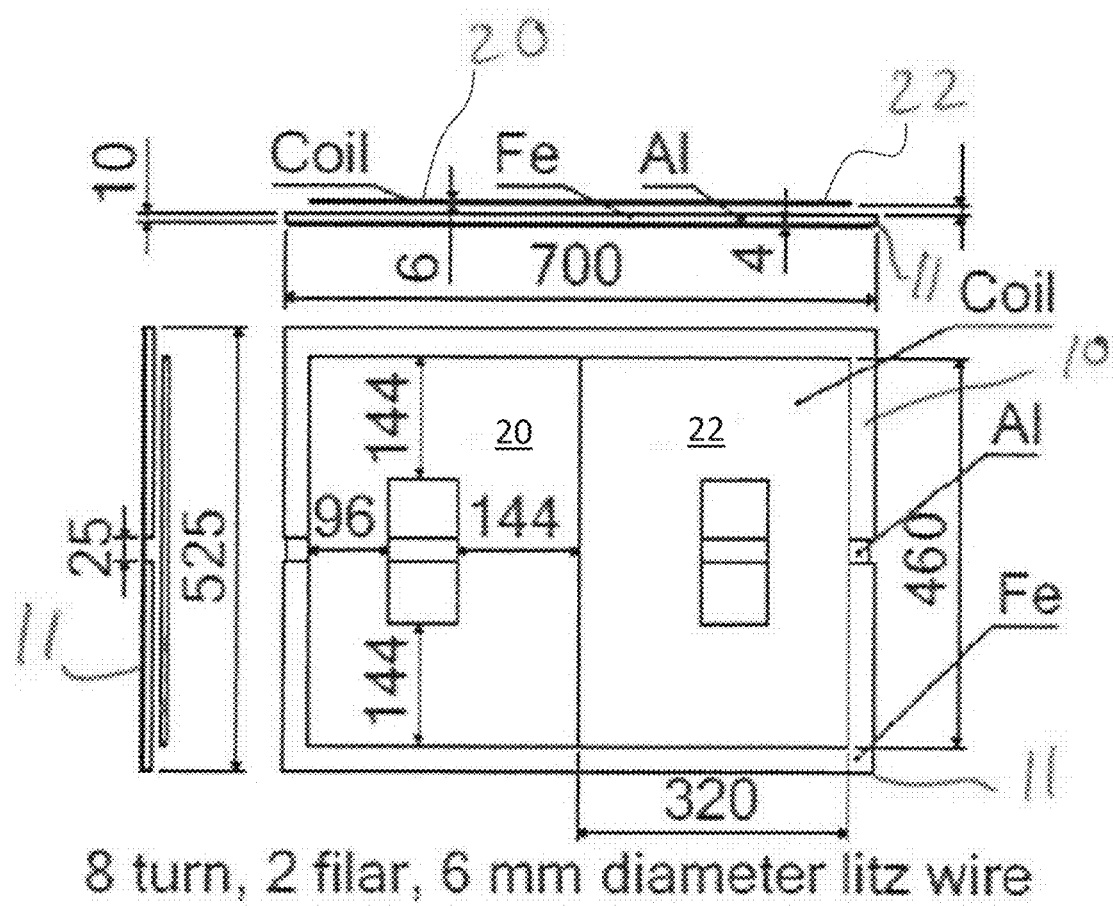
FIG. 3b is a plan view showing dimensions of the FIG. 3a constructions.

To explore the suitability of the concept of using reduced, strategically located ferrite for use in an example of a roadway application, a pad was designed for the center of the Z2 air gap range, explained below. The pad has winding (Coil 20 and 22) outer dimensions of 640 mm×460 mm and ferrite (Fe, 10) and aluminium back-plane or backplate (Al, 11) outer dimensions of 700 mm×525 mm. A conceptual representation is shown in FIG. 3a, with dimensions in FIG. 3b. A ferrite relative permeability of 2500 is used for purposes of evaluation by simulation. The direction of current flow in the coils 20 and 22 is shown by arrows 12 and 14 respectively, and the flux path 16 is shown arching from the central pole area of coil 20 to the corresponding central pole area of coil 22. It should be noted that although a DD pad has two coil structures 20 and 22, they may be wound from a single conductor or be electrically connected, so in some instances the coils 20 and 22 comprise a single electrical coil or winding.

The SAE J2954 standard specification defines the Z2 air gap region as the vehicle pad assembly to ground clearance, expecting the primary pad to be mounted on top of a road as a blister. This means that the copper to copper (i.e. coil to coil) air gap requirements are about 35 mm lower than the ground to vehicle requirements, due to a traditional primary pad having about 40 mm between the ground and the top of the copper coil, and the secondary pad having about 5 mm of casing protecting the coils. The copper to copper air gap is the distance between the top surface of the ground assembly litz wire and the bottom surface of the vehicle assembly litz wire, and is ideal for magnetic analysis. Thus the Z2 copper to copper air gap requirements are around 105 mm-175 mm.

To push towards the future requirements of higher power at higher air gaps and displacements, this disclosure focuses on a copper to copper air gap of 175 mm, displaced to (75, 100) mm (x, y), and a WPT2 power level of 7 kW. This deliberately pushes the base case ferrite system beyond its original designed copper to copper air gap of around 105-145 mm, highlighting worst case leakage and coupling of existing systems, and steering the design towards these higher power requirements. This starts to explore the boundary of what is possible with current WPT systems and future ferrite-less systems.

Secondary Pad

Figure 4:
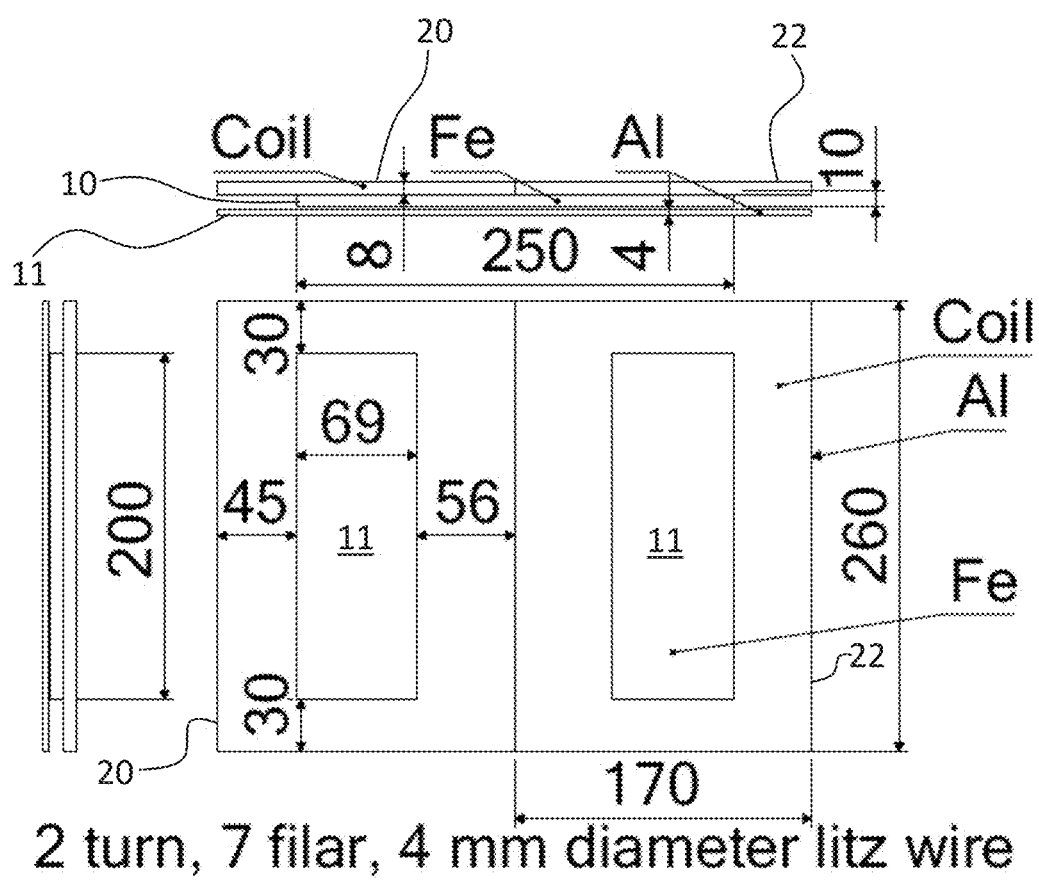
FIG. 4 is a plan view illustrating dimensions of a secondary coupling structure.

A roadway system was created by coupling the FFDD primary described above with reference to FIG. 3 to a secondary side DD pad shown in FIG. 4 at a copper to copper air gap of 175 mm.

The secondary pad of FIG. 4 is a 2 turn 7-filar DD pad of dimensions 340 mm×260 mm. The structural elements of the secondary pad shown in FIG. 4 that are the same or equivalent to those of the primary pad have the same references as those of the primary pad. All the pad variations investigated in this document have this same secondary, and it is considered to be parallel tuned. The leakage contribution of the secondary pad is for the most part independent of the secondary tuning topology and number of turns of the coils.

Figure 5:
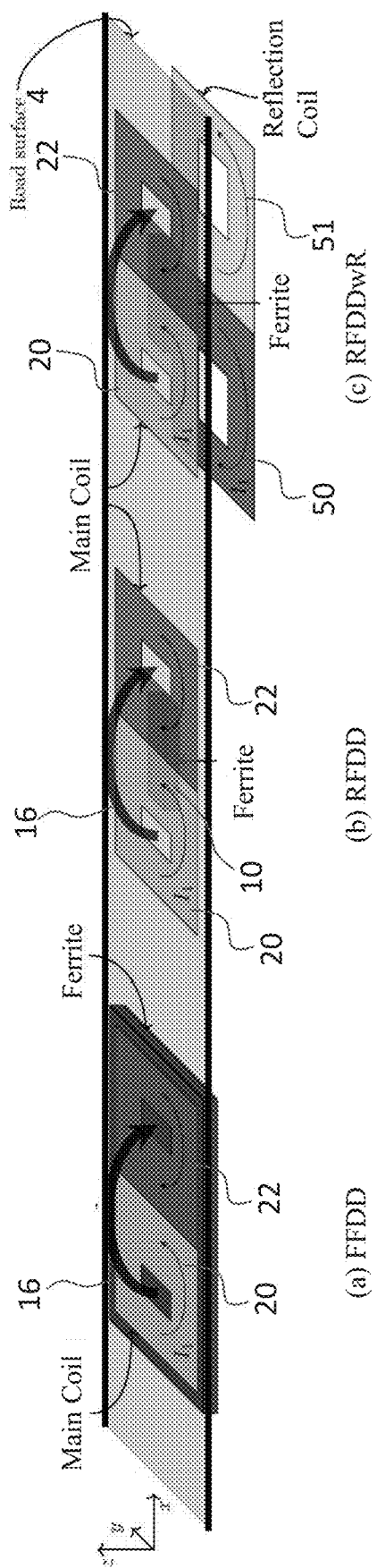
FIG. 5 is a diagrammatic isometric view of a path track or roadway showing a conceptual representation of a DD pad with: a) full ferrite base case (700 mm×525 mm); b) RFDD (250 mm×100 mm ferrite); c) RFDDwR (250 mm×100 mm ferrite) with reflection coil of 760 mm×460 mm and two turns out of phase with driven flux coupling winding.

FIG. 5 shows conceptual representations of primary pad structures that show a progression from a FFDD structure shown in FIG. 5(a), to two proposed structures RFE and RFEwR in FIGS. 5(b) and (c) respectively. The FIGS. 5 (b) and (c) structures have a much smaller amount of permeable material (ferrite) than the known structure of FIG. 5(a). FIG. 5(b) has a block of permeable material 10 which is located in the central region of the pad in a layer beneath the coils 20 and 22, and between the pole areas at the center of each coil 20 and 22. FIG. 5(c) incorporates the structure of FIG. 5(b) but also includes a reflection coil layer comprising coils 50 and 51.

Figure 6:
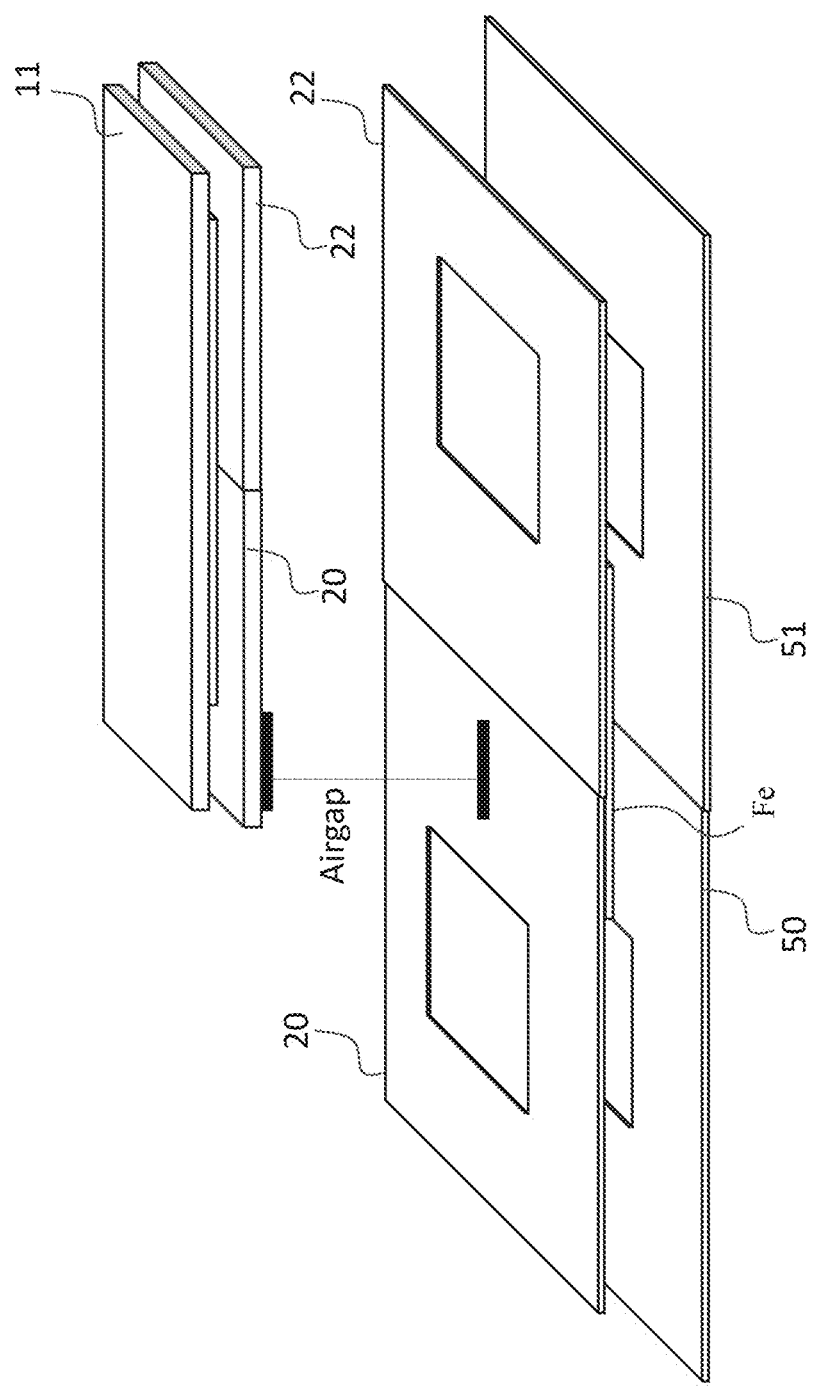
FIG. 6 is a diagrammatic isometric view of a simulation setup, showing primary pad (in this case the RFEWR), the secondary DD pad, the Airgap dimension and the X displacement and the Y displacement.

Testing performance of the proposed systems has been undertaken by simulation. An example of the simulation setup is shown in FIG. 6.

Simulation Results

To determine the magnetic parameters of the primary and secondary system of FIGS. 3 and 4, a simulation was run in JMAG Designer 14.1.01p, at an air gap of as discussed above. FIG. 7 presents the key simulated values and shows contour plots showing the value of (a) $B_{RMS}$ X, (b) $B_{RMS}$ Y, (c) $L_p$, (d) $I_1$, (e) $VA_1$ and (f) maximum B field in the ferrite as the ferrite X dimension and ferrite Y dimensions are varied as in FIG. 6. The brackets provide an indication as to the size of the ferrite, and the dashed lines indicate the dimensions of the driven winding. Leakage is taken on a plane 800 mm away from the centre of the secondary. The secondary is at a copper to copper air gap of 175 mm and displaced to (75, 100) mm (x, y). For all the plots, in general, lower is better.

Leakage planes were placed in both the X and the Y direction at a distance away from the central axis of the system. If larger levels of power transfer are required, the pads or currents can be scaled.

Reducing the Permeable Material (Ferrite)

A DD pad of the type disclosed in FIGS. 3 and 4 is designed to channel the magnetic flux between its two poles, through a "flux pipe" on the underside of the pad and through the secondary pad above the pad. This may be seen in FIG. 9. The two flux producing coils 20 and 22 are arranged in an adjacent manner side by side. These coils produce (or receive) coupling flux to couple the structure or pad to another flux coupler. The main coils may have a central aperture 24, 26. Each main coil may have opposing end portions (28, 29, 30, 31) and opposing side portions (32,33,34,35). The flux pipe spans the central end portions or regions 29, 31. The mail coils represent a first layer in the construction. Ferrite 40 may be provided in a second layer (which may be planar) beneath the coils 20 and 22. A leakage flux control coil i.e. a reflection coil (which is not seen in this Figure) may be provided beneath the ferrite as a third layer (which may be planar).

To understand the best size of the ferrite 40 for exploring a reduced ferrite structure such as that of FIG. 5(b) or 5(c), the ferrite sheet was changed for simulation purposes with the center coincident with the central axis of the coils, and increased by equal amounts in the positive and negative X and Y direction. Being rectangular, a DD pad has 2 lines of symmetry, one about the X axis and one about the Y axis.

In this evaluation, the aluminium backplate is removed completely, as is the gap between the ferrites which are typically provided as blocks. While aluminium certainly provides an effective magnetic field shield, for the purposes of the evaluation in this section it is not considered. In addition, if it is not required in a roadway application that would save cost and issues with the aluminium reacting with the concrete.

Figure 8A:
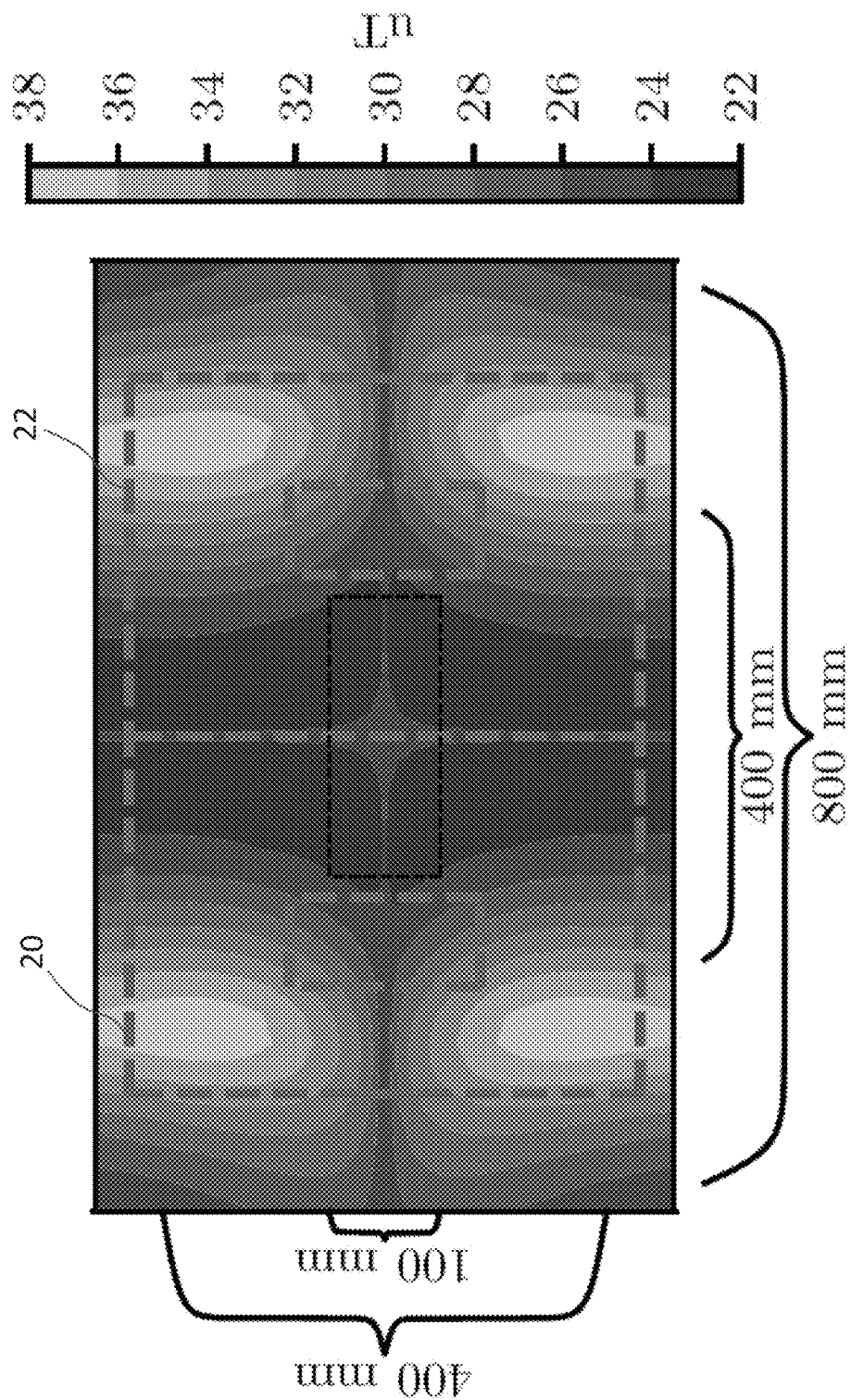
FIG. 8 is a series of plots showing leakage, inductance, current, field and VA for ferrite dimension
Figure 8B:
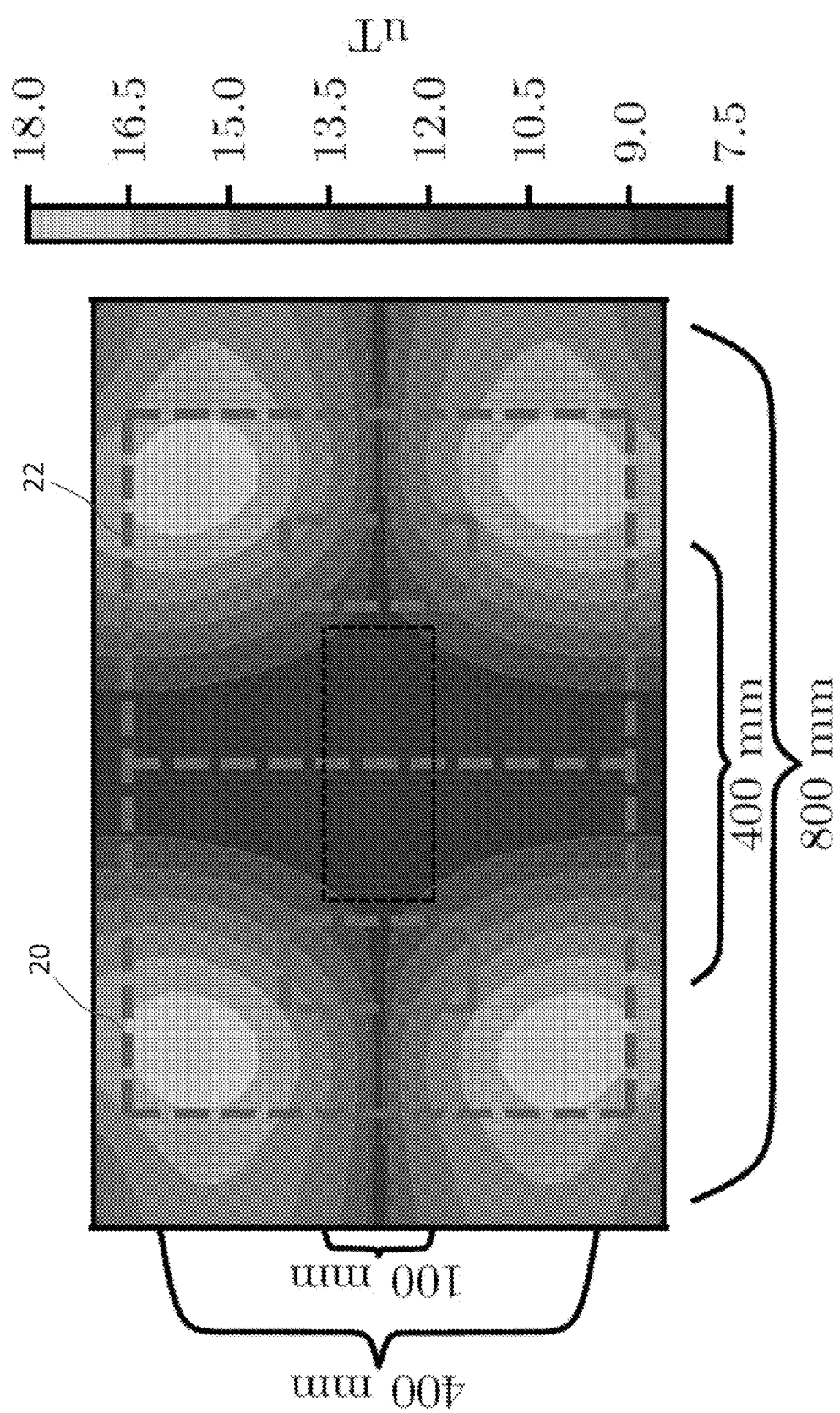
Figure 8C:
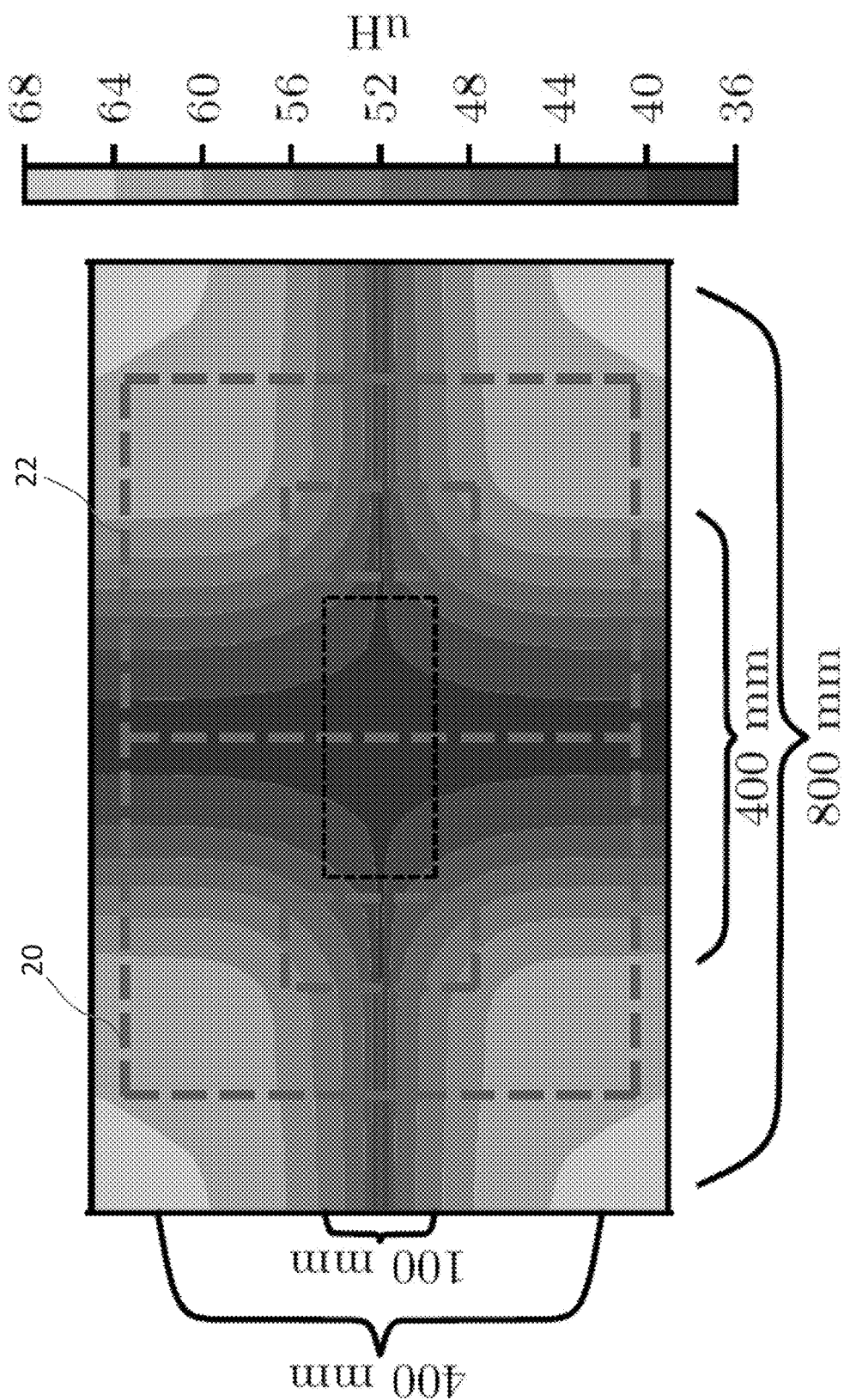
Figure 8D:
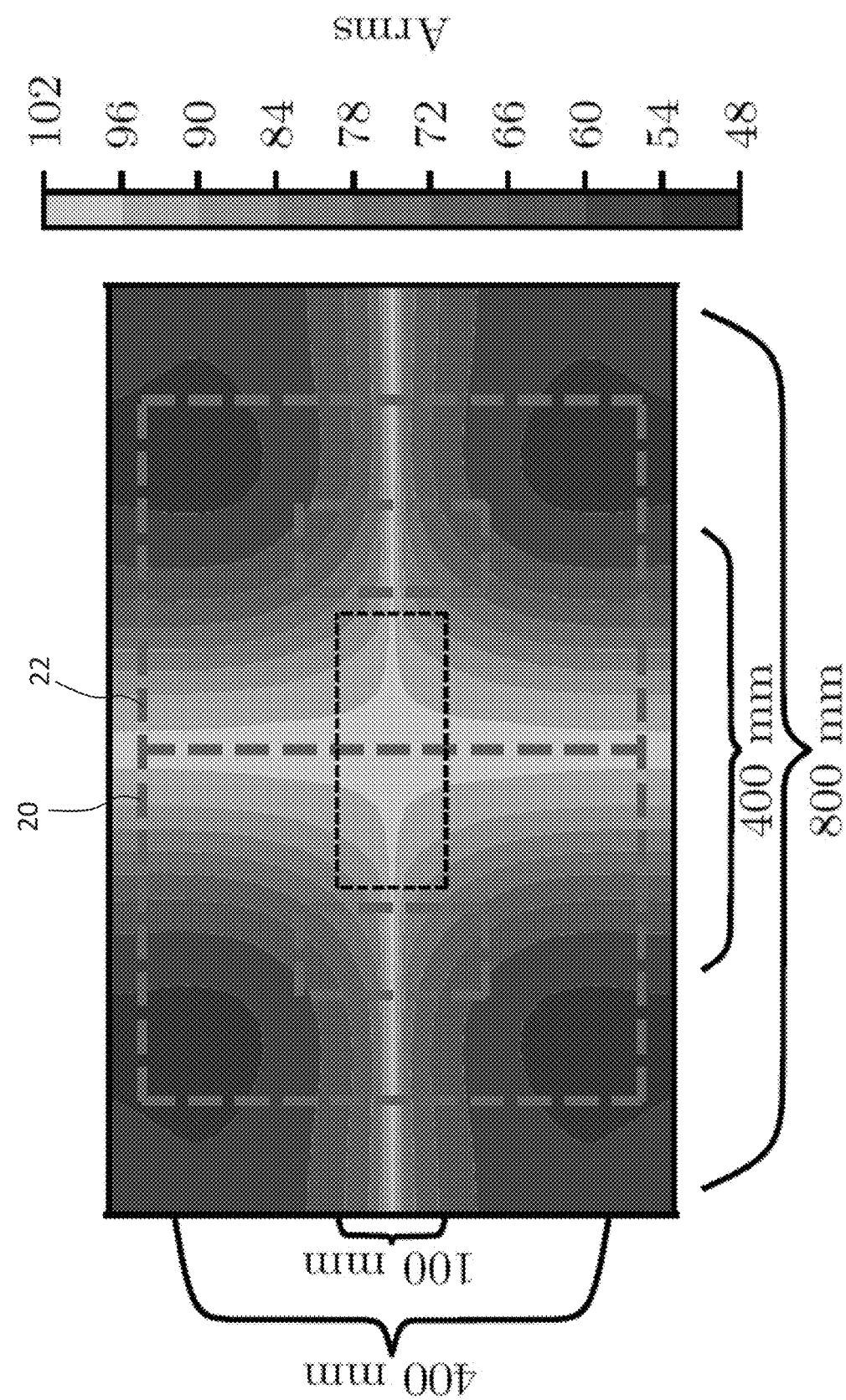
Figure 8E:
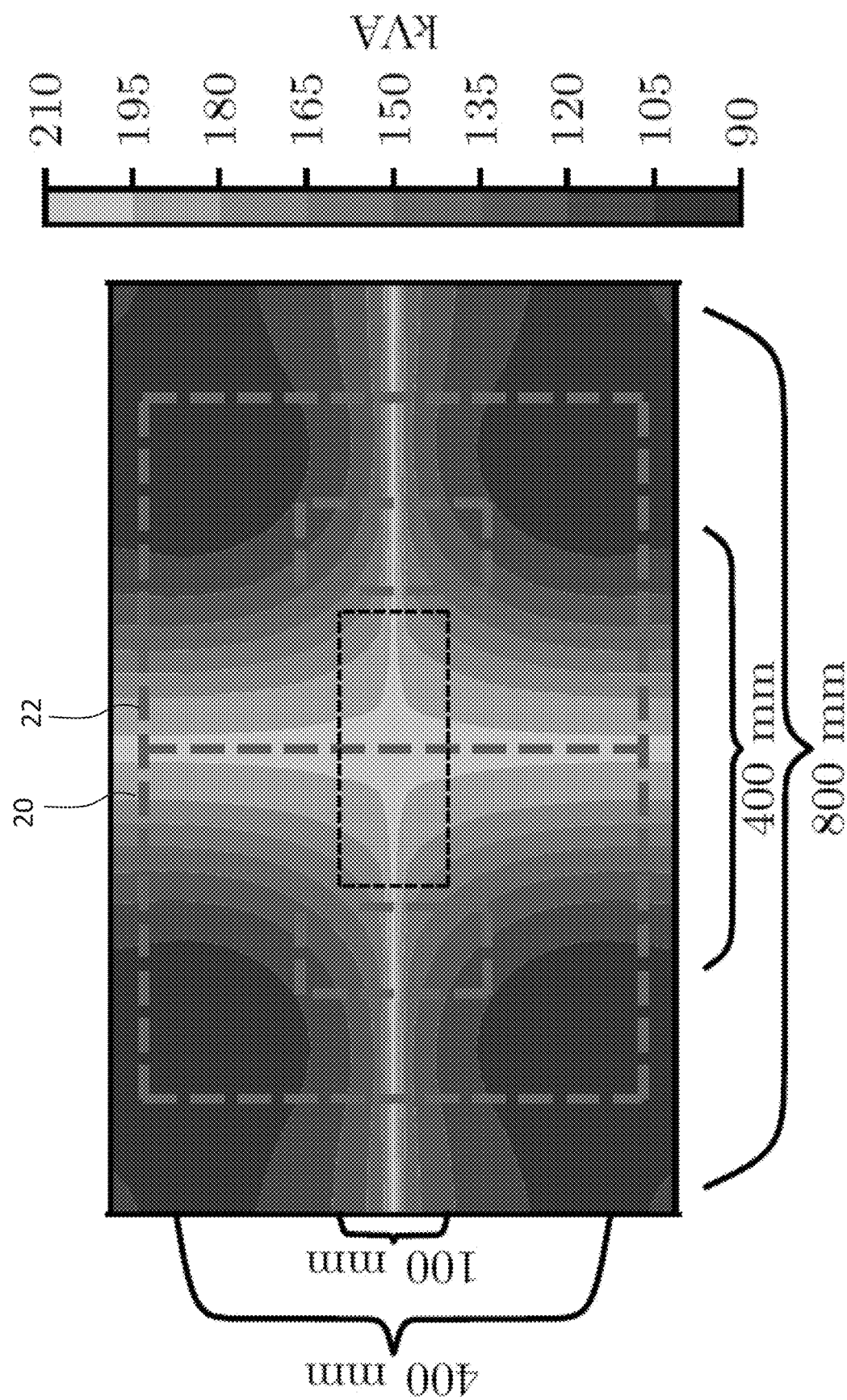
Figure 8F:
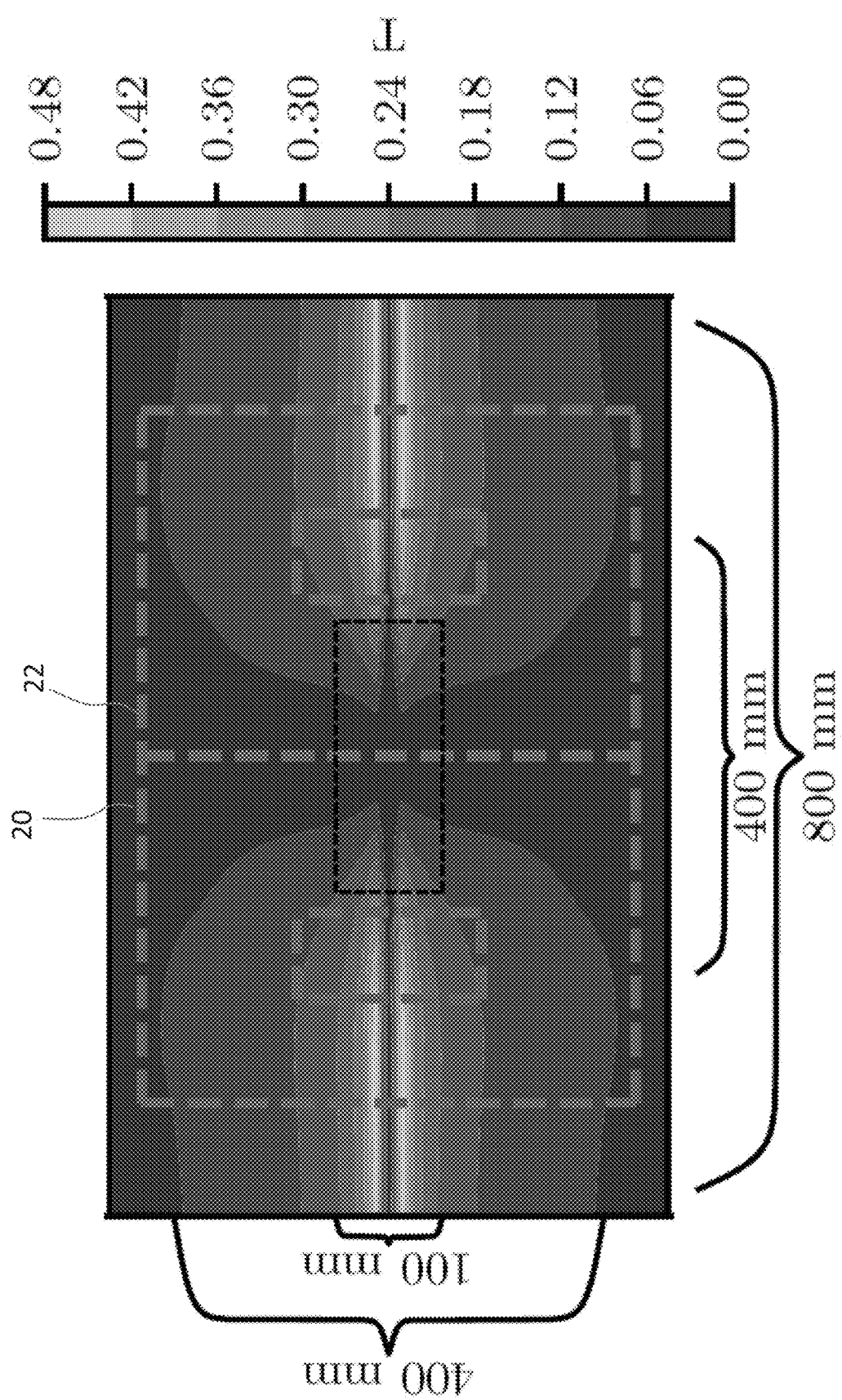
Figure 9:
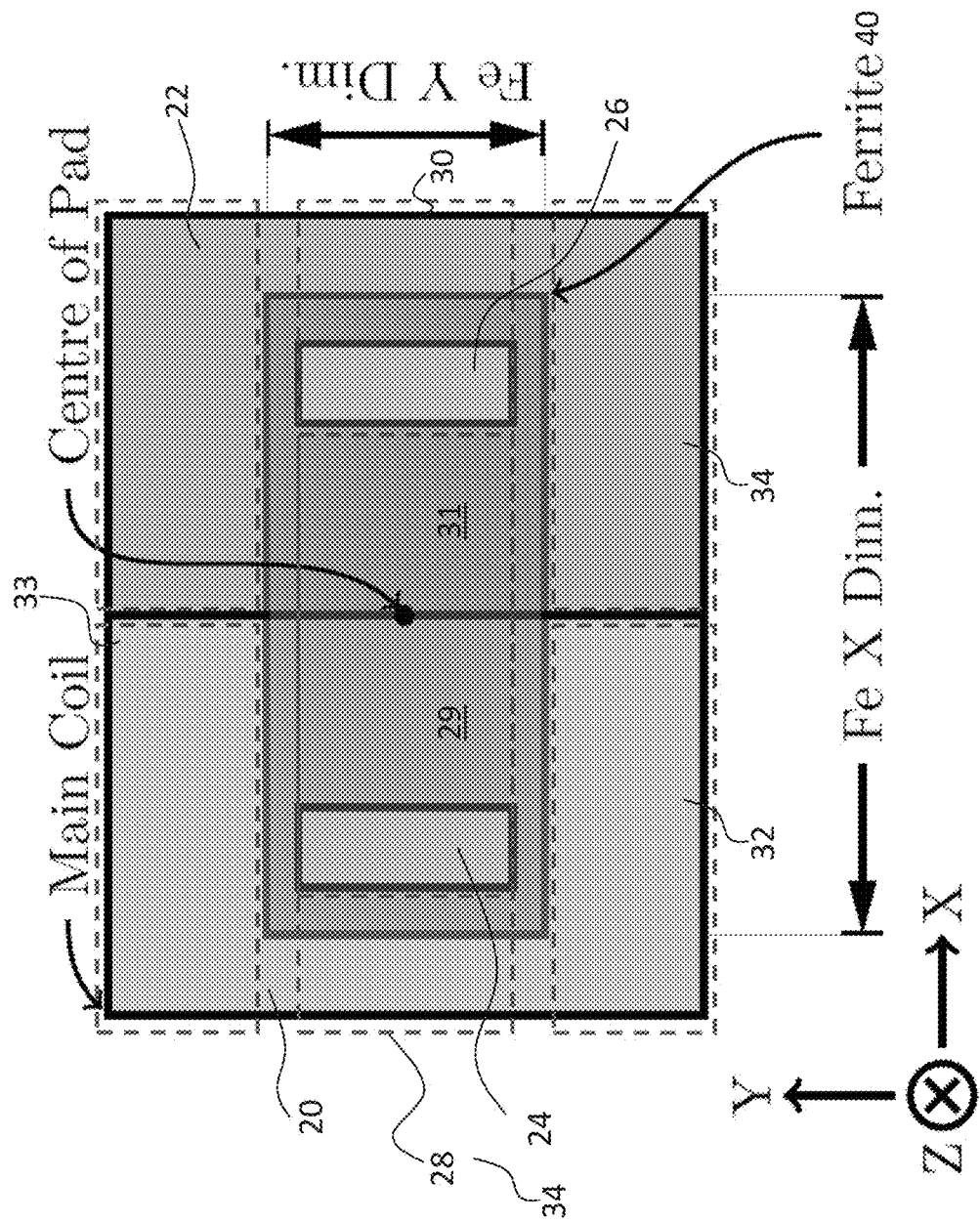
FIG. 9 is a diagram in plan view of a DD construction and FIGS. 10a and 10b are a series of plots for varying depth of reflection coil, where the reflection coil is out of phase.

Approximately 700 simulations were conducted in JMAG Designer 14.1.01p to produce the results shown in FIG. 8, which shows how the key metrics of the pad change as the size of the ferrite is changed in the x and y directions, as in FIG. 9. As illustrated in FIG. 8a the leakage in the X direction (when delivering to a fully displaced secondary at an airgap of 175 mm) is lowest when the ferrite dimension is less than about 250 mm in the X direction, and does not change much as the ferrite is extended in the Y direction. Interestingly, the leakage in the Y direction, shown in FIG. 8b shows a very similar result.

FIGS. 8c and 8d can be combined to produce the primary $VA_1$ needed to deliver 1 kVA to the secondary, shown in FIG. 8e. This shows that as the size of the ferrite is increased, the $VA_1$ needed to deliver 1 kVA reduces. Note that, like the leakage, increasing the X dimension of the ferrite has more impact than increasing the Y dimension, and that, beyond a dimension of about 400×200 mm (x,y) further increases in the size of the ferrite do not decrease the $VA_1$ required to deliver 1 kVA to the secondary further.

As the ferrite increases beyond dimensions of around 400×200 mm (x,y) the leakage in both the X and Y direction starts increasing again. Thus for this particular investigation there is very little benefit in increasing the ferrite dimensions beyond 400×200 mm (x,y).

Decreasing the size of the ferrite reduces the leakage but increases the $VA_1$ required to deliver 1 kVA to the secondary. A volume of ferrite of 250×100×10 mm (x,y,z) was chosen for a new pad construction, which consists of two 125×100× 10 mm ferrite blocks. This is illustrated by the central rectangle in all the figures in FIG. 8. The dashed lines in all the figures in FIG. 8 illustrate where the driven (flux coupling) coil or coils 20, 22 are located. Thus the selected ferrite size is just inside the flux pipe of the driven coil.

The final plot, FIG. 8f illustrates the maximum flux density in the ferrite as the size of the ferrite back plane changes, while the primary is delivering to the secondary. This shows the opposite to the other graphs in that the Y dimension has the most impact on the B field in the ferrite, until the ferrite reaches around 100 mm wide in the Y direction. This indicates that there should be a certain minimum dimension of the ferrite in the Y direction to reduce the density of the magnetic field in the ferrite back plane. In this instance a ferrite Y dimension of 100 mm appears adequate (and aligns with the size of ferrites readily available in practice).

RFDD

As discussed above, the reduced ferrite size is chosen to be 250×100 mm, which corresponds to two 125×100×10 mm (x,y,z) blocks. The original FFDD comparison pad of FIG. 3 had 28 of these blocks, so this represents a reduction in ferrite volume of 93%, for a reduction in leakage of 18% and 31% in the X and Y direction respectively. There is 11.6 times more leakage observed 200 mm below the pad in the Z direction, and an increase in VA1 of 49%.

A Z depth of 200 mm from the top of the copper of the driven coil is chosen as it allows pads with reflection windings of different depths to be fairly compared. These are discussed in the following section.

Adding a Reflection Winding (or Leakage Flux Control Coil)

This concept has been described in previous patent literature, as identified earlier in this disclosure. A cancellation coil is used to cancel the unwanted or leakage magnetic field below the pad, and to the sides as well. It takes more VA to drive the reflection coil, but, when the reflection coil is well designed, the benefits in reduced leakage are compelling for some applications.

The simulations in this paper model the coils as a solid block of copper, a current density, whereas the physical construction is made up of discrete wires forming a coil. This is a valid assumption, even when there is a large gap between the wires. This is validated by the final constructed pads.

Depth of Reflection Winding

Figure 10A:
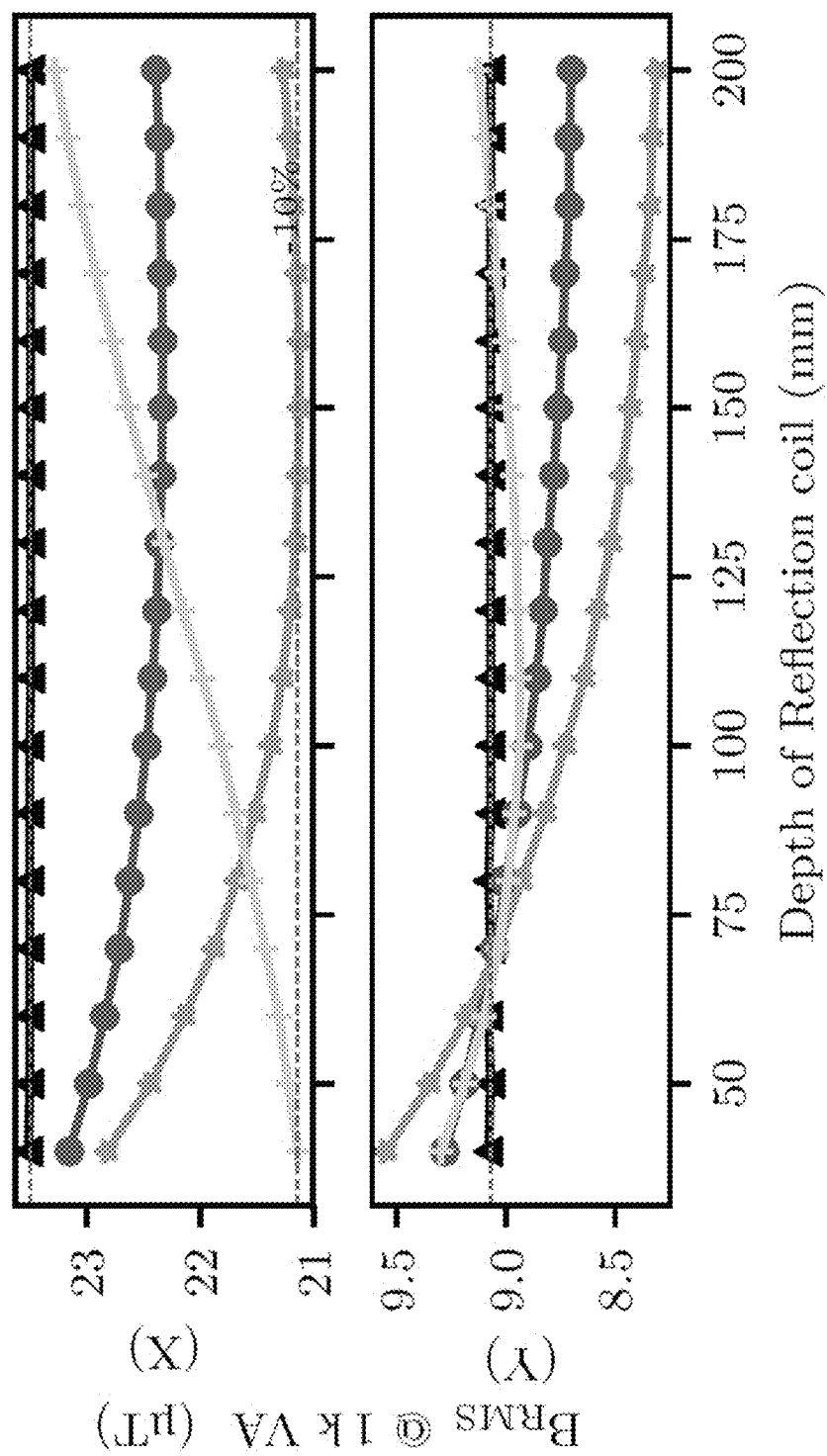
Figure 10B:
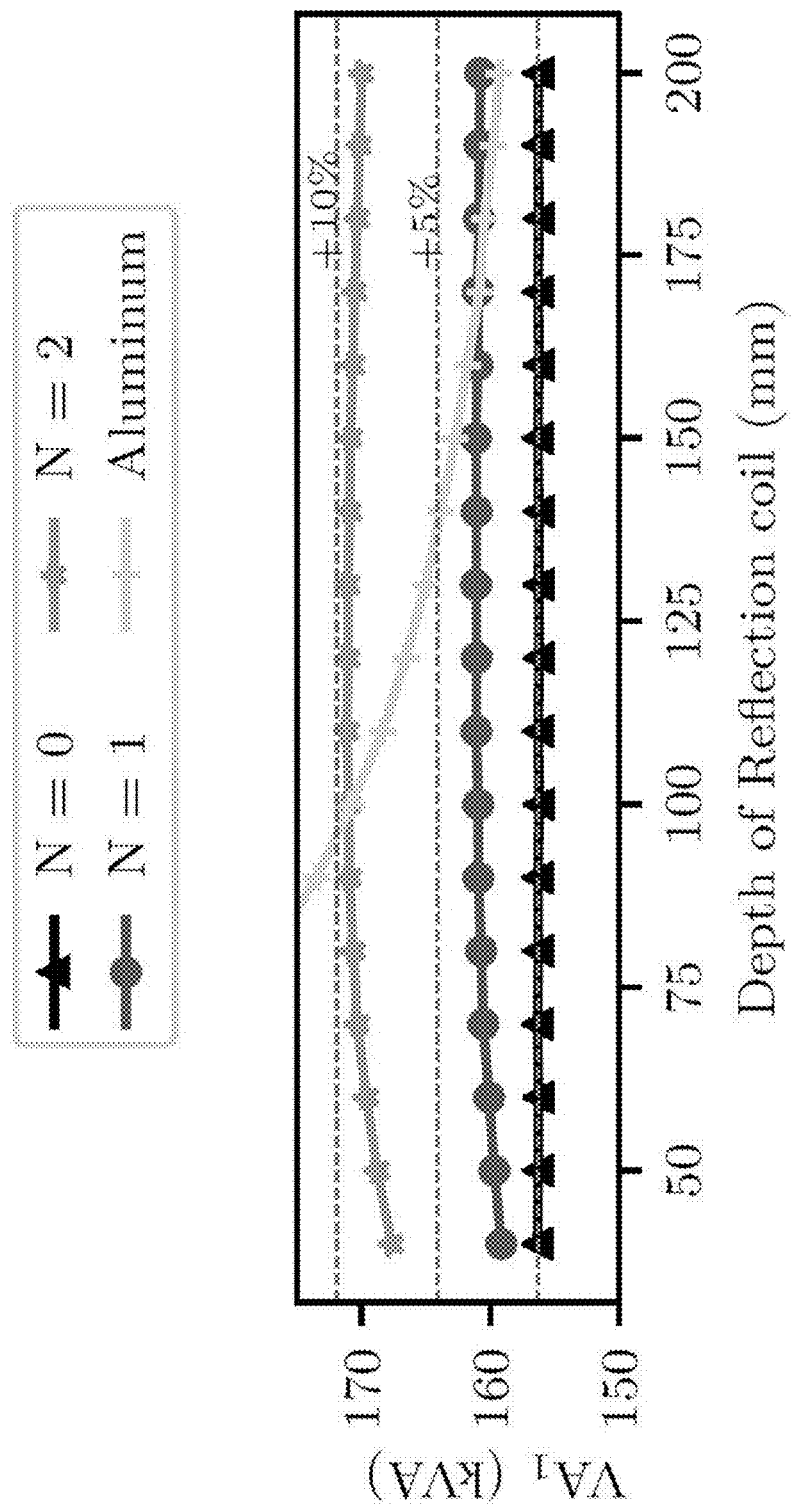

To begin to understand the benefits of the reflection winding on the RFDD, a reflection coil of the same dimensions as the driven coil was placed beneath the driven coil. The depth of this was varied from 40-200 mm, and the results processed. FIGS. 10a and 10b show the varying the depth of the reflection coil from 40-200 mm, with ferrite dimensions 250×100 mm. The leakage in the X and Y direction and the needed to deliver to the secondary are plotted for differing numbers of turns in the reflection coil.

With an out of phase reflection coil of 2 turns, the lowest leakage in the X direction of 21 uT is when the depth of reflection coil is 160 mm, giving a $VA_1$ of 167.9. This represents a decrease in X leakage of about 10% for an increase in of about 9%. As can be seen from the graphs of FIGS. 10a and 10b, the reduction in leakage is proportional to N, but the increase in appears to be proportional to $N^2$. Two turns of the reflection coil is a good compromise between reduction in leakage, increase in $VA_1$ and increase in copper volume, but other configurations can be chosen depending on what is preferred in the application. In general, the deeper the reflection coil, the less the $VA_1$ changes.

As a comparison, an aluminium sheet of the same dimensions as the reflection coil was simulated at the same set of depths (40-200 mm). As the depth increases, the leakage increases, until, when the aluminium is at a depth of 200 mm, the aluminium sheet has no impact on the leakage in the X direction (compared to having no reflection coil or aluminium at all), and actually increases the leakage in the Y direction. At the other extreme, when the aluminium is at a depth of 40 mm, the leakage is reduced by about 10% compared to no reflection coil, but the has increased by around 35%. The depths where the aluminium and the reflection coil (with different turns) have the same leakage, for N=2 the leakage is reduced by about 8% at a depth of 80 mm, but the VA1 for the aluminium is much higher (off this chart). For N=1, the leakage is about the same as the aluminium when the depth is about 130 mm. At 130 mm depth, the single turn reflection coil has a lower $VA_1$ than the aluminium, for the same reduction in leakage.

This indicates that a reflection coil allows more control of the leakage field for a lower $VA_1$ cost than an equivalently sized and placed aluminium sheet.

Depth and Extension of Reflection Winding

Another set of simulations were run extending the size of an aluminium back plane located in the same place as the reflection coil, providing a comparison with the reflection coil. The results are shown in FIG. 11. These results show that, in general, when the reflection coil X dimension is the same as the driven coil X dimension, the deeper the reflection coil, the lower the leakage in the X direction.

However, if the size of the reflection coil is extended to 900 mm in the X direction, the depth of the reflection coil is not very dependent on the depth of the reflection coil, being about a 20% reduction in leakage across the three reflection coil depths investigated.

Another interesting aspect to look at is the increase in the $VA_1$ required to deliver power to the secondary. As would be expected, the shallower the reflection coil is (the closer it is to the driven coil) the more impact changing its X dimension has on the $VA_1$ required. Looking at just N=2, in general, as the X dimension of the pad increases the higher the $VA_1$ requirement (with a corresponding decrease in LPP X).

These results show that as long as the reflection coil is made larger the depth of the reflection coil makes little difference. This allows the pad to be shallow, with the reflection coil at a depth of 40 mm.

The aluminium simulation results (listed as "Aluminium" in the key or legend in FIG. 11) show that as the depth of the aluminium increases, the leakage increases and the $VA_1$ decreases, which is intuitive as the circulating currents in the aluminium will be lower as it moves further away from the driven coil. At 100 mm depth the aluminium behaves similarly to a reflection coil of two turns, and at 160 mm depth it behaves much like a reflection coil of one turn. At a depth of 40 mm, our preferred depth, the aluminium greatly increases the $VA_1$ requirement of the pad, for the same reduction in X leakage if the reflection coil is extended to 860 mm. This is a good example of the benefits of a well-designed reflection coil, as it can reduce the leakage significantly for a relatively small increase in $VA_1$ (compared to the aluminium at 40 mm depth).

Again, looking at FIG. 11, in general as the X dimension increases the leakage in the X direction decreases and the $VA_1$ increases linearly. This begs the question then, what size to make the reflection coil, given a reduction in the leakage in the X direction and the ferrite is desired for this roadway IPT application.

There are two ways to bound the increase in X dimension, one is $VA_1$, which should be no more than 2×the full ferrite one, or 2×103≈200 kVA. With a reflection coil of two turns, the all the pads in FIG. 11 meet that requirement.

The other one is the area of the pad, which can be extended somewhat given the intended application of this pad, above ground "blister" packaging, or flush mounting. In the short term, blister mounting is more pertinent, so the reflection coil would be limited by that packaging. FIG. 12 explores this. As the blister is sloped to allow the wheel 100 to roll over the pad, the extra space at the bottom can be used to extend the reflection coil. With a reflection coil of dimensions 760 mm, the angle of the blister is 31 degrees, which seems about right.

Thus as an example design the dimensions of the reflection coil are chosen to be 760×460 mm, with a two turn reflection coil, driven out of phase with the driven coil.

Adding Ferrite at the Edge of the Pad

Given that the DD pad has more leakage in the X direction than the Y direction, it is worth strategically placing ferrite to reduce this leakage. FIG. 8 indicates that adding reflection along the central X axis could reduce the leakage in the X direction and the VA. Such a concept would look like FIG. 13. In FIG. 13, the reflection or leakage flux control coils 50 and 51 are shown. These are provided in a third layer beneath the ferrite layer. As can be seen, the ferrite layer comprises blocks 60, each block being magnetically associated with the end region of each of the main (driven in the case of a primary) flux coupling coils. The ferrite blocks do not extend to the side regions of the main coils 20 and 22. The ferrite does also not extend across the aperture (or pole region) of each of the main coils 20 and 22. Another way in which to consider this construction is that the main coils 20 and 22 have end regions that comprise conductor segments extending along the y axis, and side regions the comprise conductor segments extending along the x axis. The ferrite is located at the conductor segments along the y axis.

To compare with previous evaluations, FIGS. 14a and 14b show what happens with a reflection coil (or aluminium) is added at a depth of 40 mm, and then extended in the reflection coil in the X direction only (Y dimension is the same as the driven coil). Thus FIG. 11a and FIGS. 14a-14b are directly comparable, just with additional edge ferrite added.

Comparing FIG. 11a and FIG. 14, the black line represents no reflection coil or aluminium present (N=0). By adding the additional edge ferrite the LPP in the X direction has decreased from about 23.5 to about 20 at the expense of an increase in from about 158 kVA to about 160 kVA, which is a good trade, given the large decrease in leakage and small increase in VA. The leakage in the Y direction has also decreased by adding the additional edge ferrite.

When the reflection coil is added to the pad with additional edge ferrite the LPP decreases even further, for only a slight increase in, again a worthy trade considering how much of a reduction in leakage is obtained. Looking mainly at N=2, this gives a significant reduction in leakage, for a small increase in VA.

Once again, adding the aluminium sheet at 40 mm depth decreases the leakage significantly, but increases the even more so. Given that when using the aluminium the huge increase in to get almost the same reduction in leakage as with the two turn reflection coil, it is better to use the two turn reflection coil.

Extending the reflection coil beyond the ferrite 60 allows the reflection coil to be more effective in controlling the unwanted leakage flux. Thus as shown in FIG. 13, a part of the periphery 80 of the reflection coil extends beyond a periphery 82 of the ferrite (or ferrite layer). In this way the reflection coil has a closer magnetic association with the coil 22 which is producing the coupling flux.

Reducing Reflection Coil in Y Direction

Given increasing the dimension of the reflection coil in the X direction reduces the leakage in the X direction, and does not impact leakage in the Y leakage significantly, it seems reasonable to reduce the Y dimension of the reflection coil to attempt to reduce the $VA_1$. The nature of the DD pad is that X dimensions contribute more strongly to leakage overall, so reducing the Y dimension of the reflection coil should have little impact on the X and Y leakage. In any case the leakage in the Y direction is significantly lower than the leakage in the X direction, so increasing it a little will not impact the maximum leakage of the pad. Reducing the area of the reflection coil (by reducing the Y dimension) should decrease the overall VA1 needed to drive the pad.

The X dimension of the reflection coil was fixed at 760 mm and the depth at 40 mm.

FIG. 15 shows the results of reducing the Y dimension. Looking at the results, reducing the Y dimension of the reflection coil increases the leakage in both the X and Y direction, as expected, but not by very much. The $VA_1$ decreases as the Y dimension decreases, but again, not by very much. It appears that the $VA_1$:leakage X tradeoff is approximately linear, and gradual. Thus decreasing the Y dimension appears to have some, but little benefit.

Something to note from FIG. 7 is that the variation in primary inductance is less when there is less ferrite in the primary pad. This means the system will be better tuned across its operating range.

FIG. 16 shows the overall simulated results, and FIG. 17 summarizes the dimensions of structures disclosed in this document.

In FIG. 18, a number of DD structures as disclosed above are provided in the form of a path or track. As can be seen, the structures may be energized to provide flux paths 70, so that power may be transferred to a moving object. The ferrite 60 is placed to also provide a flux path 71 between adjacent pads. This concept may be extended to structures that comprise a single flux coupling coil and a single reflection coil. Such structures, when placed adjacent to each other to form a track are shown in FIGS. 19 and 20, with flux path 70 and 72.

This disclosure has explored what happens if ferrite is reduced in a coupling structure (particularly DD) topologies, and has presented solutions for the best placement of small volumes of permeable material such as ferrite. In general the ferrite should be placed in the centre of the pad in the flux pipe and the X dimension of the ferrite is more important than the Y dimension. The Y ferrite dimension should be at least around ⅕th of the copper dimension. To minimise the leakage the ferrite should be smaller and to minimise the VA the ferrite should be larger.

A reflection coil can be placed below the driven coil and reduced ferrite to further decrease the leakage. A reflection coil allows more control over the leakage. A lower cost than an equivalent aluminium sheet. When the reflection coil is smaller in area it reduces the leakage more when it is deeper. However, when the reflection coil is larger the depth of the reflection coil makes less of a difference on the leakage and VA.

Extra ferrite can be added at the edges of the pad where it further reduces the leakage in the X direction for only a small increase in VA.

The final design presented RFDDwRwE has a very low leakage in the X and Y direction, an increase on only 2.8 times the leakage in the Z direction and an increase in of 72% when displaced at an air gap of 175 mm. The pad is only around 50 mm thick, with a pad area of 760×460 mm, with ⅕th the volume of ferrite that was in the base case pad. This smaller ferrite block would be easier to protect and cheaper to manufacture.

Throughout the description like reference numerals will be used to refer to like features in different embodiments.

The terms "inductive power transfer" can be substituted with "transcutaneous energy transfer" which is commonly used terminology when referring to powering of implanted medical devices.

The entire disclosures of all applications, patents and publications cited above and below, if any, are herein incorporated by reference. Any discussion of the prior art throughout the specification should in no way be considered as an admission that such prior art is widely known or forms part of common general knowledge in the field.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention claimed is:

1. A wireless coupling apparatus comprising:
a first layer comprising a flux coupling coil having two opposing end regions separated by two opposing side regions;
a second layer comprising a first block of highly magnetically permeable material and a second block of highly magnetically permeable material; and
a third layer comprising a leakage flux control coil, wherein
the first block is provided proximate to one of the end regions and the second block is provided proximate to the other of the end regions.

2. The apparatus as claimed in claim 1 wherein respective blocks do not extend to the side regions of the flux coupling coil.

3. The apparatus as claimed in claim 1, wherein the flux coupling coil includes a central aperture, and wherein the blocks do not extend across the aperture.

4. The apparatus as claimed in claim 1, wherein the leakage flux control coil is located relative to a corresponding flux coupling coil to control leakage flux from the flux coupling coil.

5. The apparatus as claimed in claim 1, wherein a first side of the second layer faces the first layer, and a second side of the second layer opposite the first side faces the third layer.

6. The apparatus as claimed in claim 1, wherein:
the flux coupling coil is a first flux coupling coil;
the first layer comprises a second flux coupling coil adjacent the first flux coupling coil, the second flux coupling coil also having two opposing end regions separated by two opposing side regions; and
the second block is provided proximate to one of the end regions of the second flux coupling coil, and the first block is provided proximate only to the one of the end regions of the first flux coupling coil.

7. The apparatus as claimed in claim 1, wherein:
the flux coupling coil is a first flux coupling coil;
first layer is above the second layer, and the second layer is above the third layer, wherein the direction of gravity is from the first layer to the third layer;
the first layer comprises a second flux coupling coil adjacent the first flux coupling coil, the second flux coupling coil also having two opposing end regions separated by two opposing side regions; and
with respect to a view looking downward on the first layer, with the second layer underneath the first layer, the second block is shadowed by the other of the end regions of the first flux coupling, and the first block is shadowed only by the one of the end regions of the first flux coupling coil.

8. The apparatus as claimed in claim 7, wherein:
the second layer also comprises a third block of highly magnetically permeable material that is only shadowed by one of the end regions of the second flux coupling.

9. The apparatus as claimed in claim 8, wherein:
the second block of highly magnetically permeable material is also shadowed by the other of the end regions of the second flux coupling.

10. The apparatus as claimed in claim 1, wherein:
the flux coupling coil is a first flux coupling coil;
first layer is above the second layer, and the second layer is above the third layer, wherein the direction of gravity is from the first layer to the third layer;
the first layer comprises a second flux coupling coil abutting the first flux coupling coil, the second flux coupling coil also having two opposing end regions separated by two opposing side regions; and
the second block is provided proximate to one of the end regions of the second flux coupling coil; and
with respect to a view looking downward on the first layer, with the second layer underneath the first layer, the second block extends from a location shadowed by the first flux coupling coil to a location shadowed by the second flux coupling coil.

11. The apparatus as claimed in claim 1, wherein:
the flux coupling coil is a first flux coupling coil;
first layer is above the second layer, and the second layer is above the third layer, wherein the direction of gravity is from the first layer to the third layer;

the first layer comprises a second flux coupling coil adjacent the first flux coupling coil, the second flux coupling coil also having two opposing end regions separated by two opposing side regions; and there is only one block of the first block or the second block that extends from underneath the first flux coupling coil to underneath the second flux coupling coil.

12. The apparatus as claimed in claim 1, wherein:
the flux coupling coil is a first flux coupling coil;
first layer is above the second layer, and the second layer is above the third layer, wherein the direction of gravity is from the first layer to the third layer;
wherein the first flux coupling coil includes a first central aperture;
with respect to a view looking downward on the first layer, with the second layer underneath the first layer, there is no block extending into the first aperture.

13. A roadway including:
the wireless coupling apparatus of claim 1, wherein the flux coupling coil is a first flux coupling coil, the first layer comprises a second flux coupling coil adjacent the first flux coupling coil, the second flux coupling coil also having two opposing end regions separated by two opposing side regions, wherein
the roadway extends in a first direction from a first location to a second location and the first block and the second block are sequentially positioned along the first direction.

14. A roadway including:
the wireless coupling apparatus of claim 1, wherein the flux coupling coil is a first flux coupling coil, the first layer comprises a second flux coupling coil adjacent the first flux coupling coil, the second flux coupling coil also having two opposing end regions separated by two opposing side regions, wherein
the roadway extends in a first direction from a first location to a second location and the first block is located closer to the first location and the second block is located closer to the second location, wherein the first block does not overlap with the second block in the first direction.

15. The roadway of claim 14, wherein:
the wireless coupling apparatus includes a third block, wherein the third block is located closer to the second location than the second block, wherein the second block does not overlap with the third block in the first direction.

16. The apparatus as claimed in claim 1, wherein:
the flux coupling coil is a first flux coupling coil;
the first layer comprises a second flux coupling coil adjacent the first flux coupling coil, the second flux coupling coil also having two opposing end regions separated by two opposing side regions;
respective portions of the first flux coupling have respective current directions that are parallel and flows in opposite directions from current in respective portions of the second flux coupling; and
the first block and the second block are arrayed parallel to the respective portions of the first flux coupling having current direction that is parallel and flows in the opposite directions from current in respective portions of the second flux coupling.

17. The apparatus as claimed in claim 1, wherein:
the flux coupling coil is a first flux coupling coil;
the first layer comprises a second flux coupling coil adjacent the first flux coupling coil, the second flux coupling coil also having two opposing end regions separated by two opposing side regions;
the first flux coupling coil and the second flux coupling coil are part of a first primary pad of a roadway inductive power transfer (IPT) system;
the apparatus includes a third flux coupling and a fourth flux coupling, the third flux coupling being adjacent to the fourth flux coupling, the third flux coupling coil and the fourth flux coupling coil are part of second first primary pad of the roadway inductive power transfer (IPT) system; and
the apparatus includes a third block of highly magnetically permeable material that provides a flux path between the first primary pad and the second primary pad, and a fourth block that extends from the third flux coupling to the fourth flux coupling.

18. The apparatus as claimed in claim 17, wherein the apparatus includes a fifth block that mirrors the location of the third block relative to a center of the second pad.

19. The apparatus as claimed in claim 17, wherein:
the first, second and third and fourth blocks are arrayed in a straight line.

20. A wireless coupling apparatus comprising:
a first layer comprising two flux coupling coils, both flux coupling coils having two opposing end regions separated by two opposing side regions, respective flux coupling coils being located adjacent to each other with an end region of one coil being adjacent to an end region of the other coil;
a second layer comprising one or more blocks of highly magnetically permeable material; and
a third layer comprising two leakage flux control coils, wherein
respective block(s) are provided proximate to end regions of the flux coupling coils which are adjacent to each other.

21. The apparatus as claimed in claim 20 wherein the second layer comprises a plurality of blocks of highly permeable material, respective blocks being provided proximate to an end region.

22. The apparatus as claimed in claim 21 wherein respective blocks do not extend to the side regions of at least one of the flux coupling coils.

23. The apparatus as claimed in claim 20 wherein the flux coupling coils are positioned end to end in the first layer.

24. The apparatus as claimed in claim 20, wherein respective flux coupling coils include a central aperture, and wherein the blocks do not extend across the aperture.

25. The apparatus as claimed in claim 20, wherein respective leakage flux control coils are located relative to a corresponding flux coupling coil to control leakage flux from respective flux coupling coils.

26. The apparatus as claimed in claim 20 wherein the leakage flux control coils are located end to end in the third layer.

27. The apparatus as claimed in claim 20 wherein respective block(s) extend to the side regions of the flux coupling coil.

28. The apparatus as claimed in claim 20, wherein:
the one or more blocks include a first block of highly magnetically permeable material, a second block of highly magnetically permeable material and a third block of highly magnetically permeable material;
the first layer is above the second layer, and the second layer is above the third layer, wherein the direction of gravity is from the first layer to the third layer;
the respective block(s) correspond to the first block;

the first block extends from underneath one of the flux coupling coils to underneath the other of the flux coupling coil;

the second block is located only underneath an end region of the one of the flux coupling coil, the end region of the one of the flux cooling coil being opposite an end region of the one of the flux coupling coil under which is the first block; and the third block is only located underneath an end region of the other of the flux coupling coil that is opposite and end region of the other of the flux coupling coil under which is the first block.

29. The apparatus as claimed in claim 20, wherein:

the one or more blocks include a first block of highly magnetically permeable material, a second block of highly magnetically permeable material and a third block of highly magnetically permeable material; and the respective block(s) correspond to the first block and the second block.

30. The apparatus as claimed in claim 20, wherein:

the wireless coupling apparatus is a primary pad of a roadway inductive power transfer (IPT) system, and the second layer consists of three blocks of highly magnetically permeable material, the three blocks making up the one or more blocks.

31. A wireless coupling apparatus comprising:

a first layer comprising a flux coupling coil;

a second layer comprising a highly magnetically permeable material; and a third layer comprising a leakage flux control coil, wherein at least part of the periphery of the leakage flux control coil extends beyond a part of the periphery of the magnetically permeable material.

32. A wireless coupling track or path comprising a plurality of adjacent wireless coupling apparatus as claimed in claim 31.

33. A roadway including a track or path as claimed in claim 32.

* * * * *